(12) United States Patent
Lin et al.

(10) Patent No.: US 12,367,189 B2
(45) Date of Patent: Jul. 22, 2025

(54) SYSTEMS AND METHODS FOR EFFICIENT BULK DATA DELETION

(71) Applicant: Kinaxis Inc., Ottawa (CA)

(72) Inventors: Angela Lin, Ottawa (CA); Dylan Ellicott, Ottawa (CA); Marin Creanga, Ottawa (CA)

(73) Assignee: Kinaxis Inc., Ottawa (CA)

( * ) Notice: Subject to any disclaimer, the term of this patent is extended or adjusted under 35 U.S.C. 154(b) by 0 days.

(21) Appl. No.: 17/897,881

(22) Filed: Aug. 29, 2022

(65) Prior Publication Data

US 2023/0064907 A1    Mar. 2, 2023

Related U.S. Application Data

(60) Provisional application No. 63/238,348, filed on Aug. 30, 2021.

(51) Int. Cl.
| | | |
|---|---|---|
| *G06F 7/00* | (2006.01) | |
| *G06F 16/22* | (2019.01) | |
| *G06F 16/23* | (2019.01) | |

(52) U.S. Cl.
CPC .......... *G06F 16/2386* (2019.01); *G06F 16/22* (2019.01); *G06F 16/2343* (2019.01); *G06F 16/2358* (2019.01)

(58) Field of Classification Search
CPC ................. G06F 16/2386; G06F 16/22; G06F 16/2343; G06F 16/2358
USPC ..... 707/609, 999.003, 999.2, 610, 640, 661, 707/672, 758, 781, 999.206; 711/100, 711/103, 112, 118, 141, 159; 709/203, 709/204, 205, 206, 224
See application file for complete search history.

(56) References Cited

U.S. PATENT DOCUMENTS

| | | |
|---|---|---|
| 4,648,036 A | 3/1987 | Gallant |
| 5,551,046 A | 8/1996 | Mohan et al. |
| 5,884,307 A | 3/1999 | Depledge et al. |
| 6,535,869 B1 | 3/2003 | Housel, III |
| 6,606,626 B1 * | 8/2003 | Ponnekanti ......... G06F 16/2343 709/203 |
| 7,765,211 B2 | 7/2010 | Bhattacharjee et al. |
| 7,962,447 B2 | 6/2011 | Chen et al. |
| 9,348,833 B2 | 5/2016 | Schreter et al. |
| 9,875,054 B2 | 1/2018 | Vishniac et al. |

(Continued)

*Primary Examiner* — Md I Uddin
(74) *Attorney, Agent, or Firm* — Ruggiero McAllister & McMahon LLC

(57) ABSTRACT

Systems and methods for efficient bulk data deletion. The system comprises: 1) a deletion record set; an in-memory database representation comprising: tables and records; one or more exclusive locks for the records; and a record block index; 2) a persistent database representation comprising: record blocks; and a transaction log. The method comprises: receiving, by a processor, a deletion record set; acquiring, by the processor, an exclusive lock for one or more records in the deletion record set; deleting, by the processor, the deletion record set from an in-memory representation of the database; generating, by the processor, one or more post-delete record block sets; updating, by the processor, an in-memory record block index; writing, by the processor, the one or more post-delete record block sets to a persistent storage representation of the database; and, adding, by the processor, a transaction log entry for the record block index update.

15 Claims, 19 Drawing Sheets

(56) References Cited

U.S. PATENT DOCUMENTS

| | | | |
|---|---|---|---|
| 10,133,500 B2 | 11/2018 | Vishniac et al. | |
| 10,671,641 B1 | 6/2020 | Holenstein et al. | |
| 10,740,312 B1 | 8/2020 | Mritunjai et al. | |
| 2007/0055702 A1* | 3/2007 | Fridella | G06F 16/122 |
| 2007/0130224 A1 | 6/2007 | Fischer et al. | |
| 2014/0317048 A1* | 10/2014 | Wang | G06F 16/2379 |
| | | | 707/607 |
| 2016/0012549 A1 | 1/2016 | Block et al. | |
| 2021/0096886 A1* | 4/2021 | McLachlan | G06F 3/0481 |

* cited by examiner

SYSTEMS AND METHODS FOR EFFICIENT BULK DATA DELETION

CROSS-REFERENCE TO RELATED APPLICATIONS

This application claims priority to U.S. Ser. No. 63/238,348 filed Aug. 30, 2021, which is hereby incorporated by reference in its entirety.

BACKGROUND

A query-based method of deleting a large number of records from a database temporarily increases the size of the database. This increase is proportional to the number of record versions being deleted. This increase can exceed the machine capacity when billions of records need to be deleted. Furthermore, such a method is slow because it adds more data to the database. Many alternative methods of bulk deleting records are also problematic since they require taking the database offline.

BRIEF SUMMARY

Disclosed herein are systems and methods that enable deletion of large numbers of records from a database quickly, without greatly increasing the size of the database, transactionally, and without taking the database offline.

A system for efficient bulk data deletion can comprise: a) a deletion record set; b) an in-memory database representation, which itself may comprise: tables and records; one or more exclusive locks for the records; and a record block index; and c) a persistent database representation, which itself can comprise: record blocks; and a transaction log.

The systems and methods disclosed herein do not add data to the database in order to complete the deletion, and thus do not exceed machine capacity.

The systems and methods disclosed herein quickly delete bulk data; they are faster than query-based deletion since the process is batch-based and can be parallelized.

The systems and methods disclosed herein delete bulk data transactionally. By making the bulk delete part of the transaction log, the database restore treats the operation as atomic.

The systems and methods disclosed herein delete bulk data without taking the database offline. The bulk delete operation can by synchronized using database locks such that the operation interleaves correctly with other live database operations.

In one aspect, a computer-implemented method for bulk data deletion from a database, the method includes receiving, by a processor, a deletion record set, acquiring, by the processor, an exclusive lock for one or more records in the deletion record set, deleting, by the processor, the deletion record set from an in-memory representation of the database, generating, by the processor, one or more post-delete record block sets, updating, by the processor, an in-memory record block index, writing, by the processor, the one or more post-delete record block sets to a persistent storage representation of the database, and adding, by the processor, a transaction log entry for the updated record block index update.

In the computer-implemented method, the step of deleting the deletion record set from the in-memory representation of the database, and the step of generating the one or more post-delete record block sets, can be performed in parallel.

In the computer-implemented method the step of updating the in-memory record block index can be performed in parallel with the steps of writing the one or more post-delete record block sets and adding the transaction log entry.

The computer-implemented method may also include, when generating the one or more post-delete record block sets: initializing, by the processor, a list of post-delete record block sets to empty, selecting, by the processor, an unprocessed table from the database, selecting, by the processor, an unprocessed version from the selected table, generating, by the processor, a post-delete record block set for the selected table and the selected version, and adding, by the processor, the post-delete record block set for the selected table, and selected version to the list of post-delete record block sets.

The computer-implemented method may also include, when updating the in-memory record block index: selecting, by the processor, an unprocessed version, selecting, by the processor, an unprocessed table associated with the unprocessed version, replacing, by the processor, the record block for the selected table and the selected version with the post-delete record blocks for the selected table and the selected version. Other technical features may be readily apparent to one skilled in the art from the following figures, descriptions, and claims.

In one aspect, a system includes a processor. The system also includes a memory storing instructions that, when executed by the processor, configure the system to receive, by a processor, a deletion record set, acquire, by the processor, an exclusive lock for one or more records in the deletion record set, delete, by the processor, the deletion record set from an in-memory representation of a database, generate, by the processor, one or more post-delete record block sets, update, by the processor, an in-memory record block index, write, by the processor, the one or more post-delete record block sets to a persistent storage representation of the database, and add, by the processor, a transaction log entry for the updated record block index update.

The system may also include where the memory storing instructions that, when executed by the processor, further configure the system to execute deletion of the deletion record set from the in-memory representation of the database, and generation of the one or more post-delete record block sets, in parallel.

The system may also include where the memory storing instructions that, when executed by the processor, further configure the system to execute, by the processor, updating the in-memory record block index, in parallel with writing the one or more post-delete record block sets to the persistent storage representation of the database, and adding the transaction log entry for the updated record block index update.

The system may also include, when generating the one or more post-delete record block sets, the memory storing instructions that, when executed by the processor, further configure the system to initialize, by the processor, a list of post-delete record block sets to empty, select, by the processor, an unprocessed table from the database, select, by the processor, an unprocessed version from the selected table, generate, by the processor, a post-delete record block set for the selected table and the selected version, and add, by the processor, the post-delete record block set for the selected table and the selected version to the list of post-delete record block sets. When generating the post-delete record block set for the selected table and the selected version, the computer-implemented method may also include: initializing, by the processor, a per-(table, version) post-delete record block set to empty, selecting, by the processor, an unprocessed record block from a pre-delete set, the unprocessed record block containing a record to be deleted, producing, by the processor, a modified copy of the record block that omits both a record id and a record body that corresponds to the record to be deleted, and adding, by the processor, the modified copy to the per (table, version) post-delete record block set. includes initializing, by the processor, a per-(table, version) post-delete record block set to empty, selecting, by the processor, an unprocessed record block from a pre-delete set, the unprocessed record block containing a record to be deleted, producing, by the processor, a modified copy of the record block that omits both a record id and a record body that corresponds to the record to be deleted, and adding, by the processor, the modified copy to the per (table, version) post-delete record block set. When generating the post-delete record block set for the selected table and the selected version, the system may also include the memory storing instructions that, when executed by the processor, further configure the system to initialize, by the processor, a per-(table, version) post-delete record block set to empty, select, by the processor, an unprocessed record block from a pre-delete set, the unprocessed record block containing a record to be deleted, produce, by the processor, a modified copy of the record block that omits both a record id and a record body that corresponds to the record to be deleted, and add, by the processor, the modified copy to the per (table, version) post-delete record block set.

The system may also include, when updating the in-memory record block index, the memory storing instructions that, when executed by the processor, further configure the system to select, by the processor, an unprocessed version, select, by the processor, an unprocessed table associated with the unprocessed version, replace, by the processor, the record block for the selected table and the selected version with the post-delete record blocks for the selected table and the selected version. Other technical features may be readily apparent to one skilled in the art from the following figures, descriptions, and claims.

In one aspect, a non-transitory computer-readable storage medium, the computer-readable storage medium including instructions that when executed by a computer, cause the computer to receive, by a processor, a deletion record set, acquire, by the processor, an exclusive lock for one or more records in the deletion record set, delete, by the processor, the deletion record set from an in-memory representation of a database, generate, by the processor, one or more post-delete record block sets, update, by the processor, an in-memory record block index, write, by the processor, the one or more post-delete record block sets to a persistent storage representation of the database, and add, by the processor, a transaction log entry for the updated record block index update.

The computer-readable storage medium may also include where the computer-readable storage medium includes instructions that when executed by a computer, further cause the computer to execute deletion of the deletion record set from the in-memory representation of the database, and generation of the one or more post-delete record block sets, in parallel.

The computer-readable storage medium may also include where the computer-readable storage medium including instructions that when executed by a computer, further cause the computer to execute updating the in-memory record block index, in parallel with writing the one or more post-delete record block sets to the persistent storage representation of the database, and adding the transaction log entry for the updated record block index update.

The computer-readable storage medium may also include, when generating the one or more post-delete record block sets, the computer-readable storage medium including instructions that when executed by a computer, further cause the computer to initialize, by the processor, a list of post-delete record block sets to empty, select, by the processor, an unprocessed table from the database, select, by the processor, an unprocessed version from the selected table, generate, by the processor, a post-delete record block set for the selected table and the selected version, and add, by the processor, the post-delete record block set for the selected table, and selected version to the list of post-delete record block sets. When generating the post-delete record block set for the selected table and the selected version, the computer-readable storage medium may also include instructions that when executed by a computer, further cause the computer to initialize, by the processor, a per-(table, version) post-delete record block set to empty, select, by the processor, an unprocessed record block from a pre-delete set, the unprocessed record block containing a record to be deleted, produce, by the processor, a modified copy of the record block that omits both a record id and a record body that corresponds to the record to be deleted, and add, by the processor, the modified copy to the per (table, version) post-delete record block set. the computer-readable storage medium including instructions that when executed by a computer, further cause the computer to initialize, by the processor, a per-(table, version) post-delete record block set to empty, select, by the processor, an unprocessed record block from a pre-delete set, the unprocessed record block containing a record to be deleted, produce, by the processor, a modified copy of the record block that omits both a record id and a record body that corresponds to the record to be deleted, and add, by the processor, the modified copy to the per (table, version) post-delete record block set.

The computer-readable storage medium may also include, when updating the in-memory record block index, the computer-readable storage medium including instructions that when executed by a computer, further cause the computer to select, by the processor, an unprocessed version, select, by the processor, an unprocessed table associated with the unprocessed version, replace, by the processor, the record block for the selected table and the selected version with the post-delete record blocks for the selected table and the selected version. Other technical features may be readily apparent to one skilled in the art from the following figures, descriptions, and claims.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced. Like reference numbers and designations in the various drawings indicate like elements.

DETAILED DESCRIPTION

Figure 1:
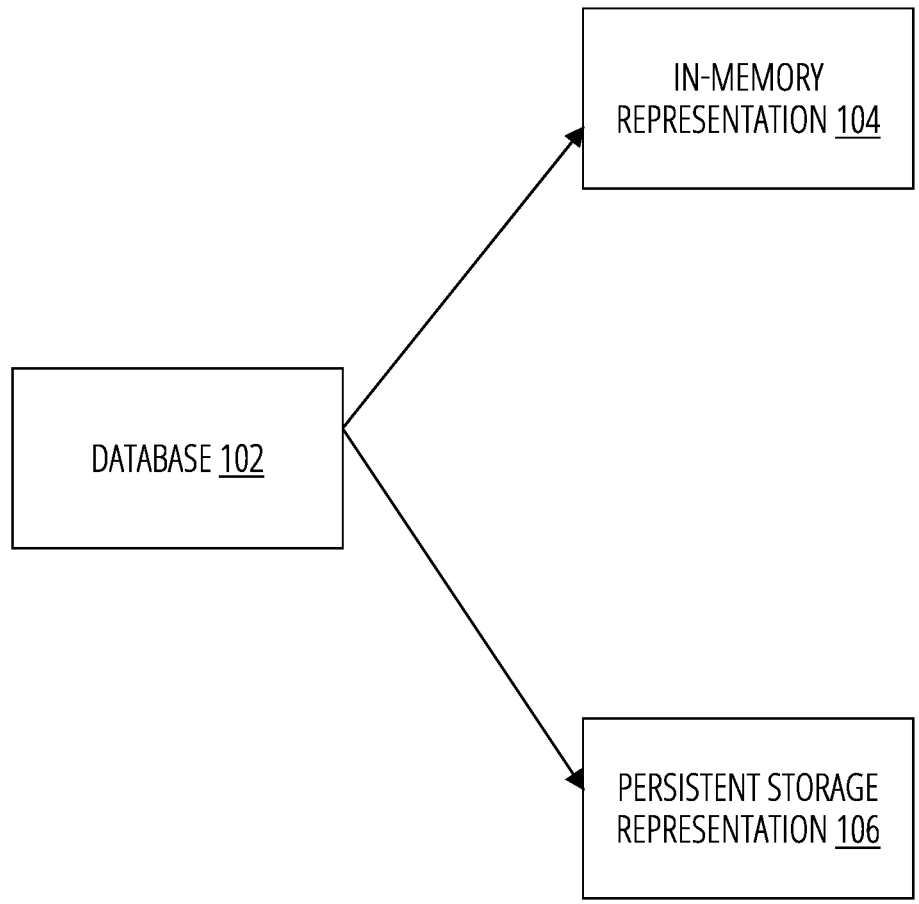
FIG. 1 illustrates a database in accordance with one embodiment.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

FIG. 1 illustrates a database 102 in accordance with one embodiment.

Database 102 includes an in-memory representation 104. "Memory" can be generalized to any persistence-optional, random access storage. In some embodiments of in-memory representation 104, memory can be a dynamic random access memory (DRAM).

Database 102 also includes a persistent storage representation 106. Persistent storage can be a rotating disk, a solid state drive (SSD), non-volatile memory express (NVMe) storage, and the like.

The in-memory representation 104 of the database 102 is volatile/transient. It can always be reconstructed from the persistent storage representation 106 of the database 102.

Figure 2:
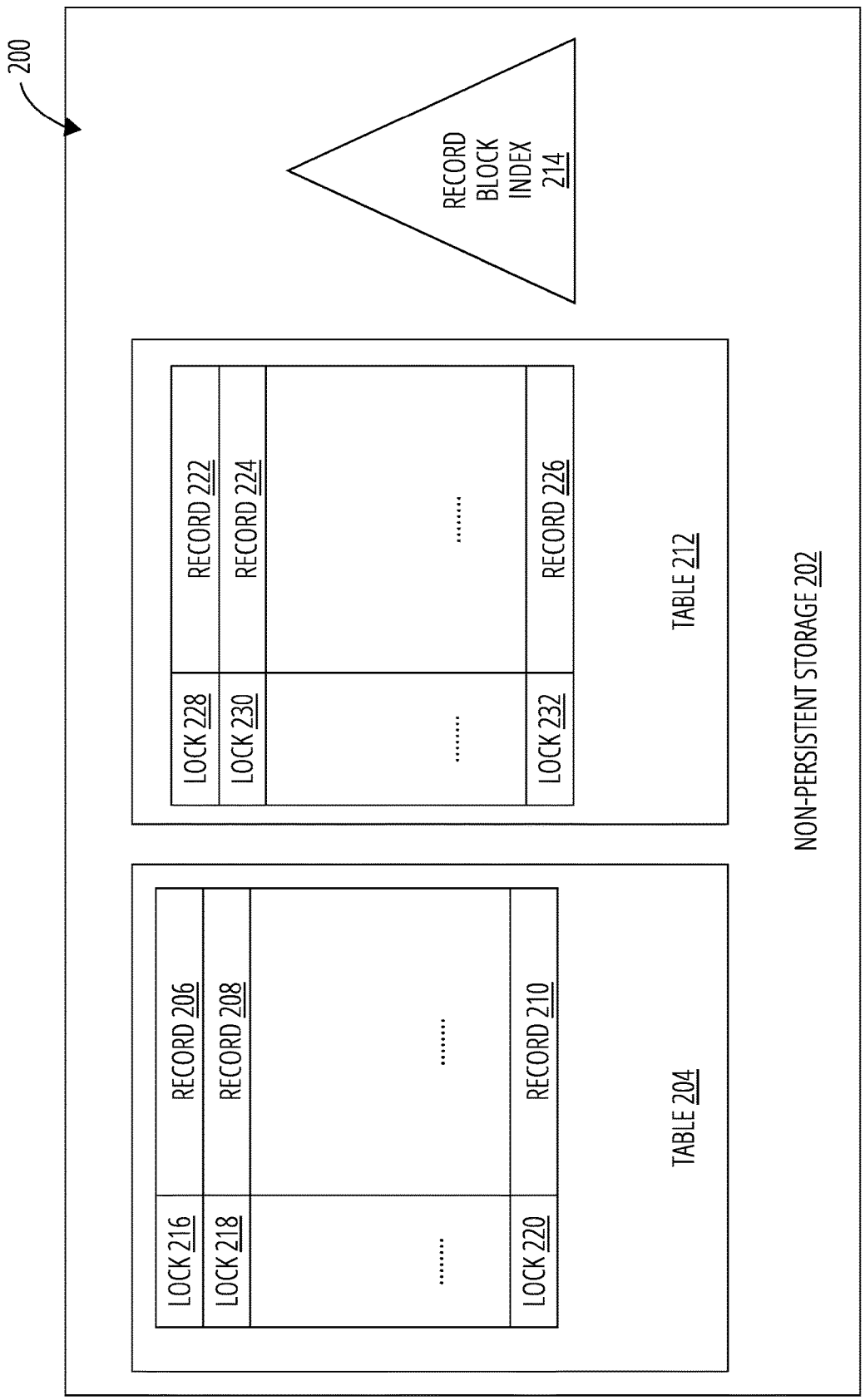
FIG. 2 illustrates an in-memory representation of a database in accordance with one embodiment.

FIG. 2 illustrates an in-memory representation 200 in accordance with one embodiment.

The in-memory representation 200 of the database may include a non-persistent storage 202 that includes one or more tables. While two tables (table 204, table 212) are shown in FIG. 2, it is understood that the non-persistent storage 202 can include more than two tables. Each table can contain zero, one or more records. For example table 204 contains record 206, record 208 and record 210; while table 212 contains record 222, record 224 and record 226. Furthermore, non-persistent storage 202 includes a record block index 214. In addition, non-persistent storage 202 can include one or more locks which enforce exclusive access to each record. For example, record 206 is associated with lock 216; record 208 with lock 218; and record 210 with lock 220. Similarly, record 222 is associated with lock 228; record 224 with lock 230 and record 226 with lock 232. A record does not need to be associated exclusively with a lock. The lock can also be associated with other records and entities. In one embodiment, there can be a many-to-1 association between records and locks, e.g. a single lock may be used to bar access to all records of a table. For example, locks 216, 218, 220 etc. don't need to be distinct locks. This is also discussed in FIG. 13.

Figure 3:
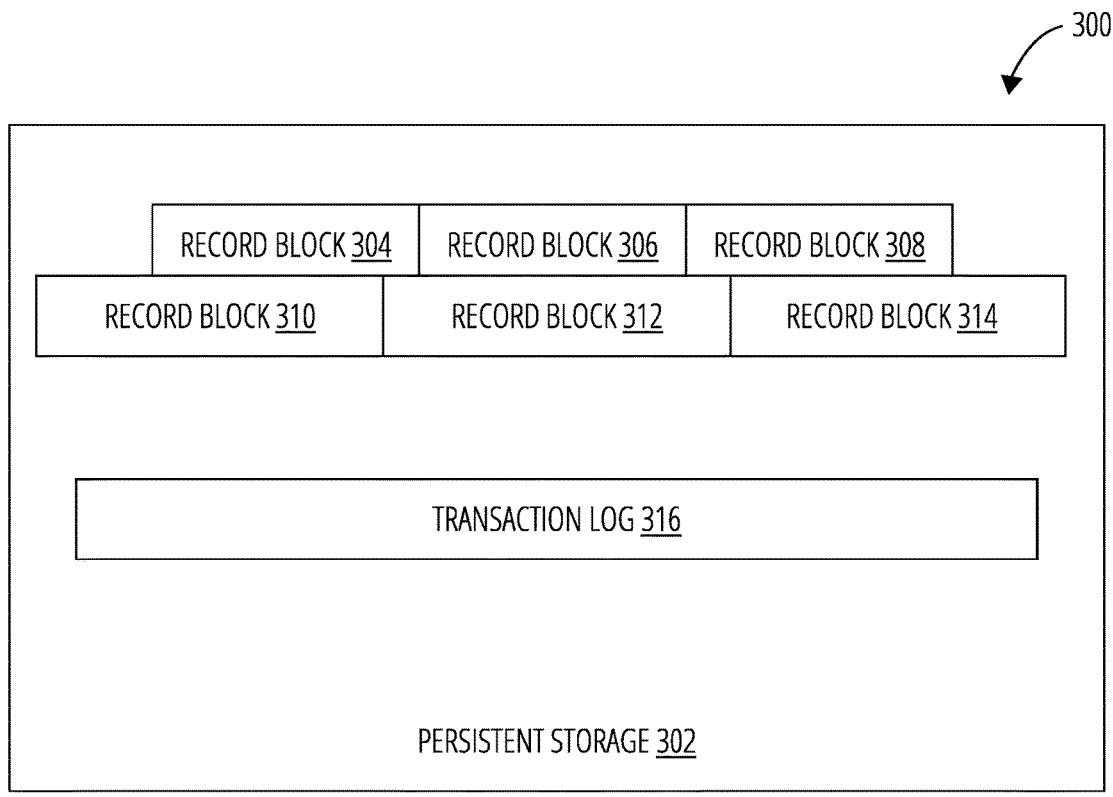
FIG. 3 illustrates a persistent storage representation of a database in accordance with one embodiment.

FIG. 3 illustrates a persistent storage representation 300 of a database in accordance with one embodiment.

The persistent storage representation 300 includes persistent storage 302. The persistent storage 302 includes a set of zero or more record blocks (for example, record block 304-record block 314); and a transaction log 316.

Figure 4:
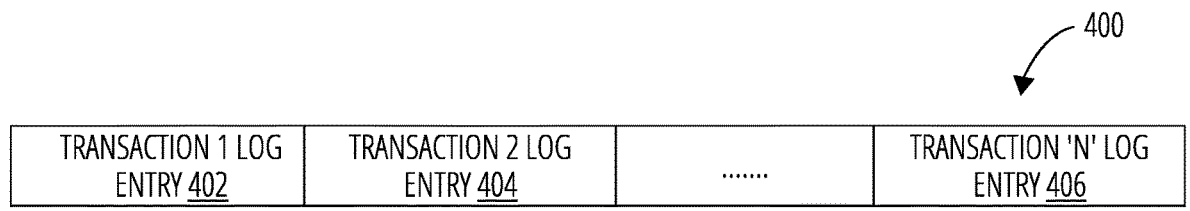
FIG. 4 illustrates a transaction log in accordance with one embodiment.

FIG. 4 illustrates a transaction log 400 in accordance with one embodiment.

The transaction log 400 includes a sequence of transaction log entries (for example, transaction 1 log entry 402, transaction 2 log entry 404 and transaction 'N' log entry 406). Each transaction log entry describes an ACID (that is, atomic, consistent, isolated and durable) update to the database. The state of the database at a given transaction—for example, transaction 'M'—can be reconstructed by sequentially applying transactions 1 through 'M'.

Figure 5:
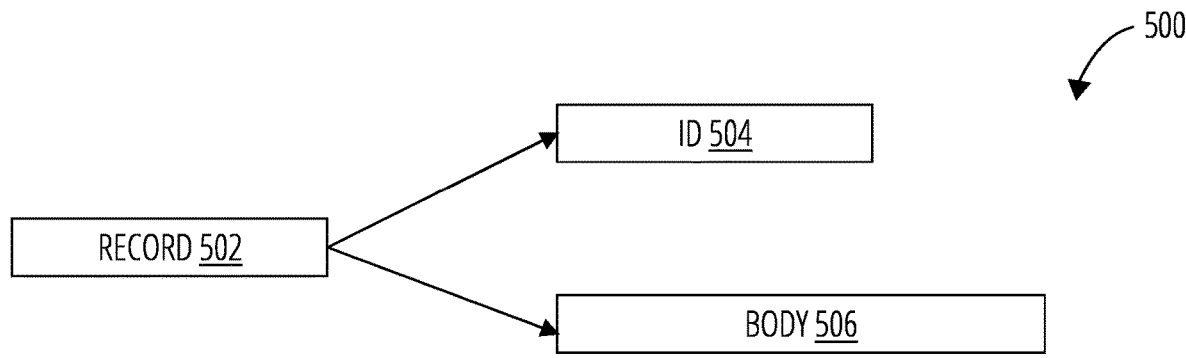
FIG. 5 illustrates an in-memory representation of a record in accordance with one embodiment.

FIG. 5 illustrates an in-memory representation 500 of a record in accordance with one embodiment. In FIG. 5, the record 502 is unversioned.

The in-memory representation of a record 502 is associated with an Id 504 and a Body 506. The Body 506 contains the data associated with the record. For example, if a table is a phone book and a record is a phone book entry such as: "Smith", "Joe", "555-1234", then the record's body contains: "Smith", "Joe", "555-1234". The record's Id is a value that uniquely identifies the record within the table. The Id can be an ordinal number. The Id is unique within the scope of a single table. Records from different tables may have the same Id.

Figure 6:
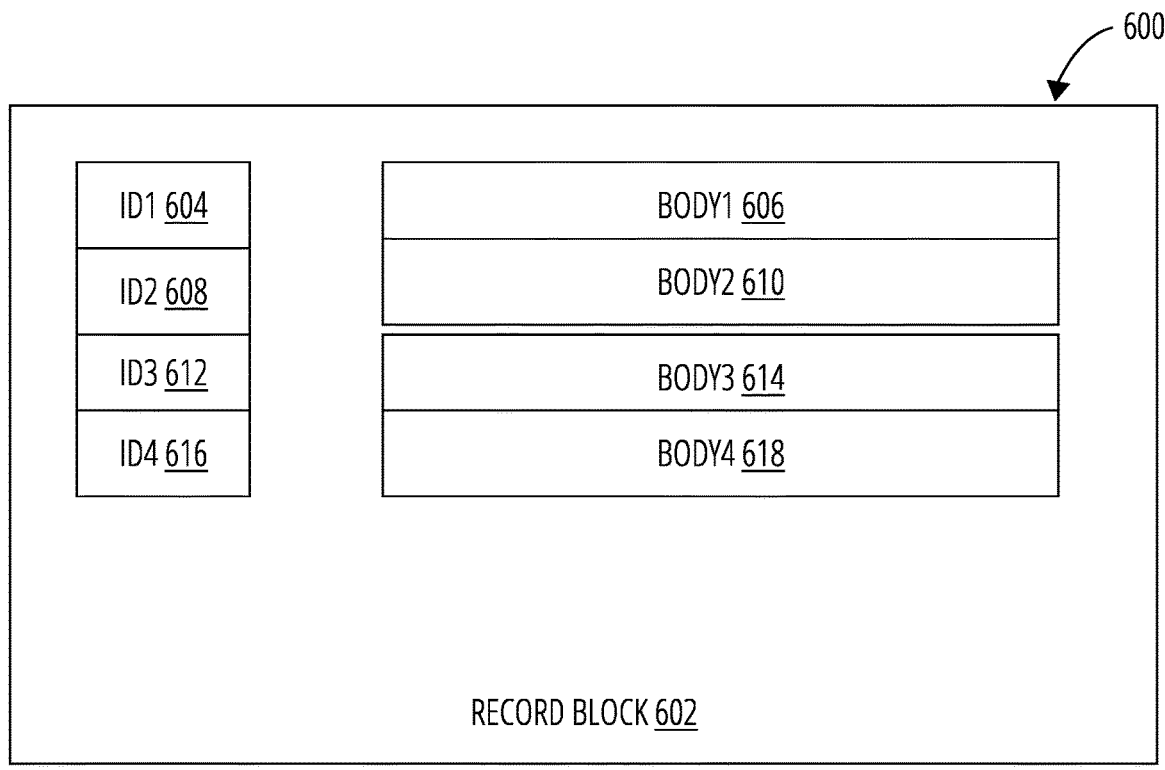
FIG. 6 illustrates the persistent storage representation of a record block in accordance with one embodiment.

FIG. 6 illustrates the persistent storage representation 600 of a record block in accordance with one embodiment.

In the persistent storage representation of the database, records are stored in one or more record blocks. In FIG. 6, a record block 602 contains a set of record ids (for example, ID1 604, ID2 608, ID3 612 and ID4 616). The record block also contains the set of record bodies (for example, body1 606, body2 610, body3 614 and body4 618) that are associated with the corresponding record ids.

Figure 7:
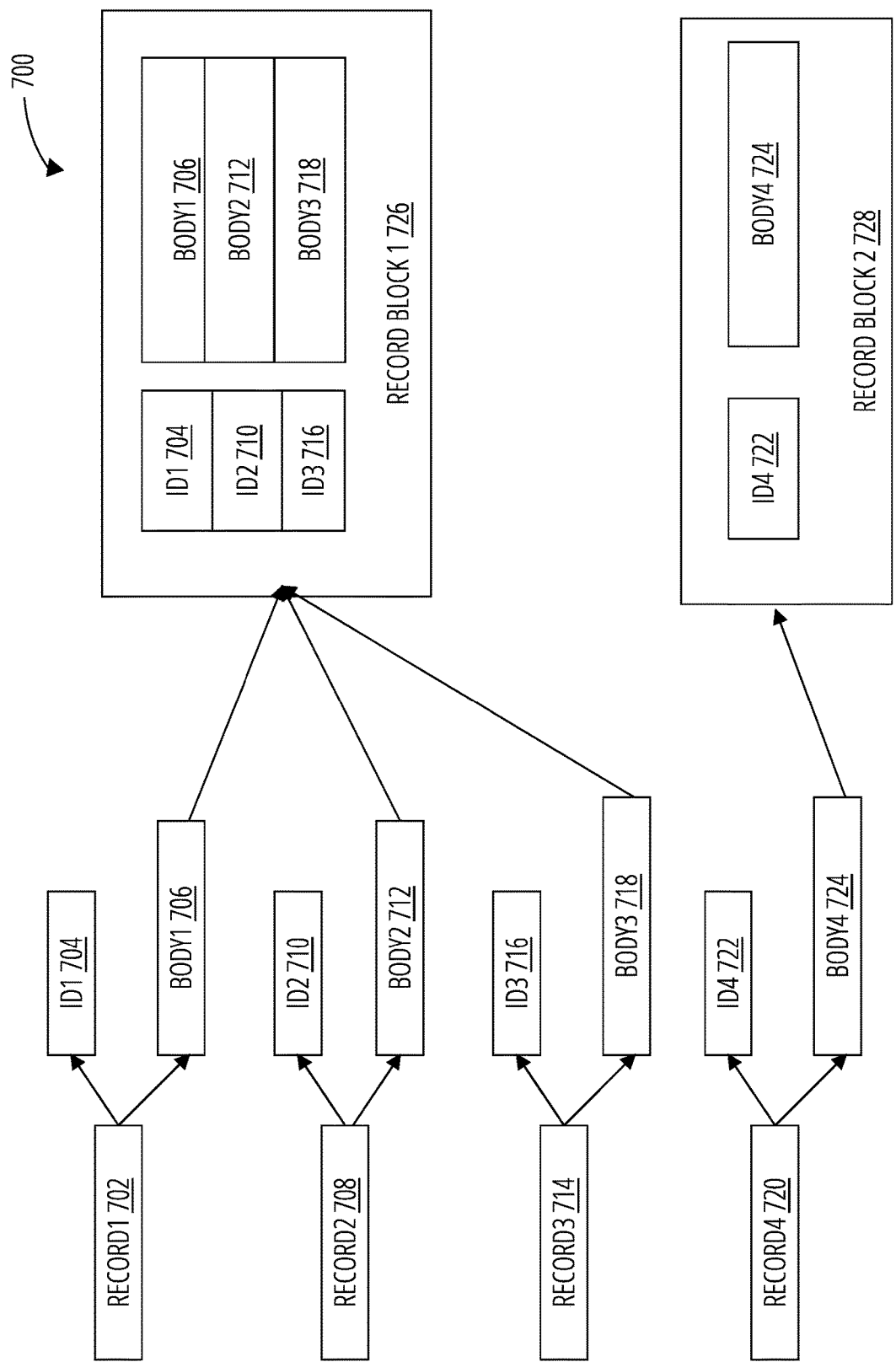
FIG. 7 illustrates a relationship between unversioned records and record blocks in accordance with one embodiment.

FIG. 7 illustrates a relationship 700 between unversioned records and record blocks in accordance with one embodiment. Record blocks are scoped to a table—that is, a record block can contain records from only one table. Records from different tables must be contained in different record blocks. In FIG. 7, Record1 702, Record2 708, Record3 714 and Record4 720 all belong to the same table.

The records of a table are arbitrarily divided among record blocks. The record blocks of a table can each contain a different number of records. For example, in FIG. 7, Record1 702, Record2 708 and Record3 714 are contained in Record block 1 726, while Record4 720 is contained in Record block 2 728.

Figure 8:
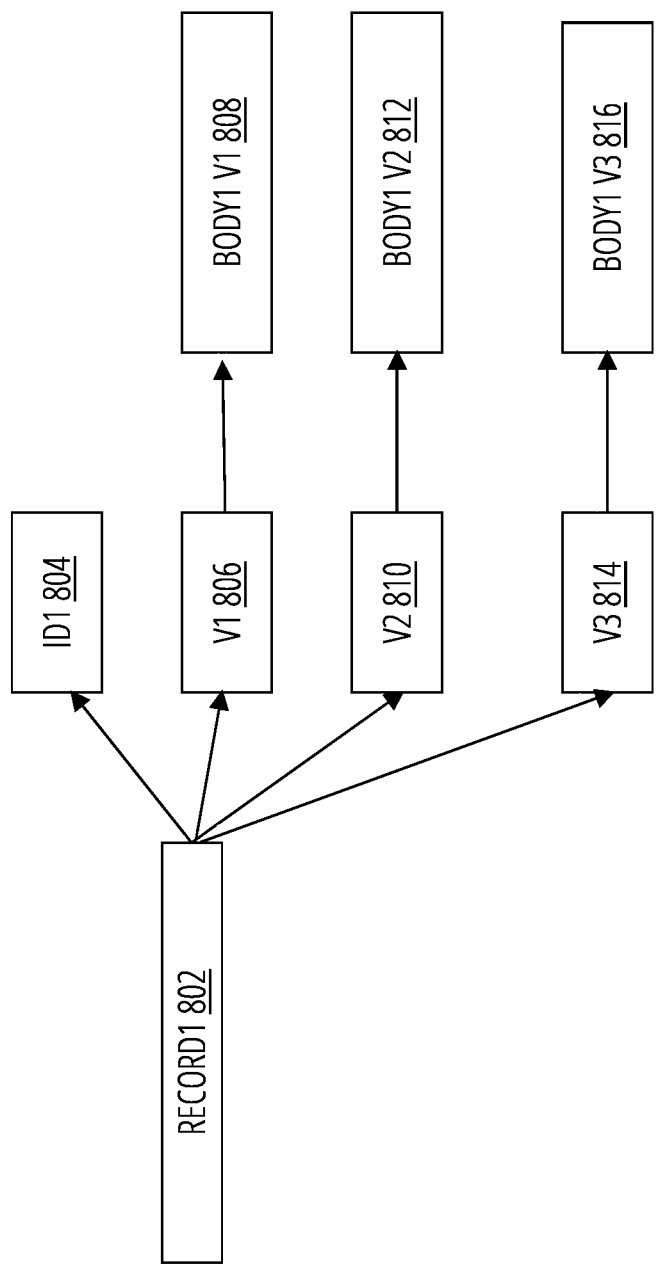
FIG. 8 illustrates an in-memory representation of a versioned record, in accordance with one embodiment.

FIG. 8 illustrates an in-memory representation of a versioned record 800, in accordance with one embodiment.

A versioned database stores multiple versions of each record. A database that can store only one version of each record is called an unversioned database.

In a versioned database, each record is a versioned record. Each record has an Id (as in FIG. 5), one or more associated versions and a body associated with each version. For example, in FIG. 8, Record1 802 has Id1 804; and associated versions v1 806, v2 810 and v3 814. Body1 v1 808 is associated with version v1 806; Body1 v2 812 is associated with version v2 810; and Body1 v3 816 is associated with version v3 814.

Figure 9:
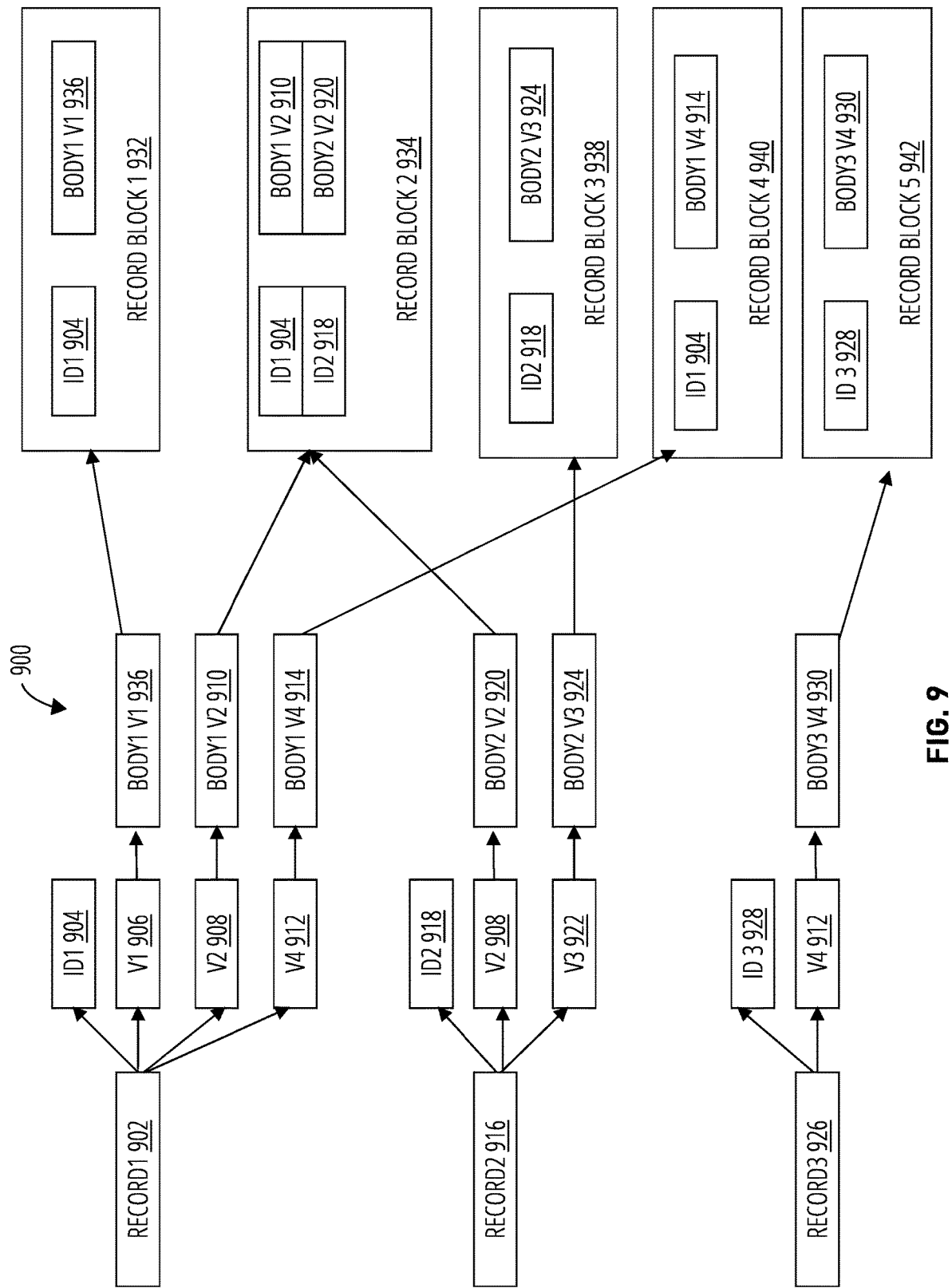
FIG. 9 illustrates a relationship of versioned records to record blocks in accordance with one embodiment.

FIG. 9 illustrates a relationship 900 of versioned records to record blocks in accordance with one embodiment.

The record blocks for a versioned database are scoped to a table and a version. That is, a record block can contain records from only one version of one table. Records from different tables or different versions are contained in different record blocks.

As with unversioned record blocks, the records of a table and version are arbitrarily divided among record blocks. A version can be associated with zero, one or more record blocks.

Figure 10:
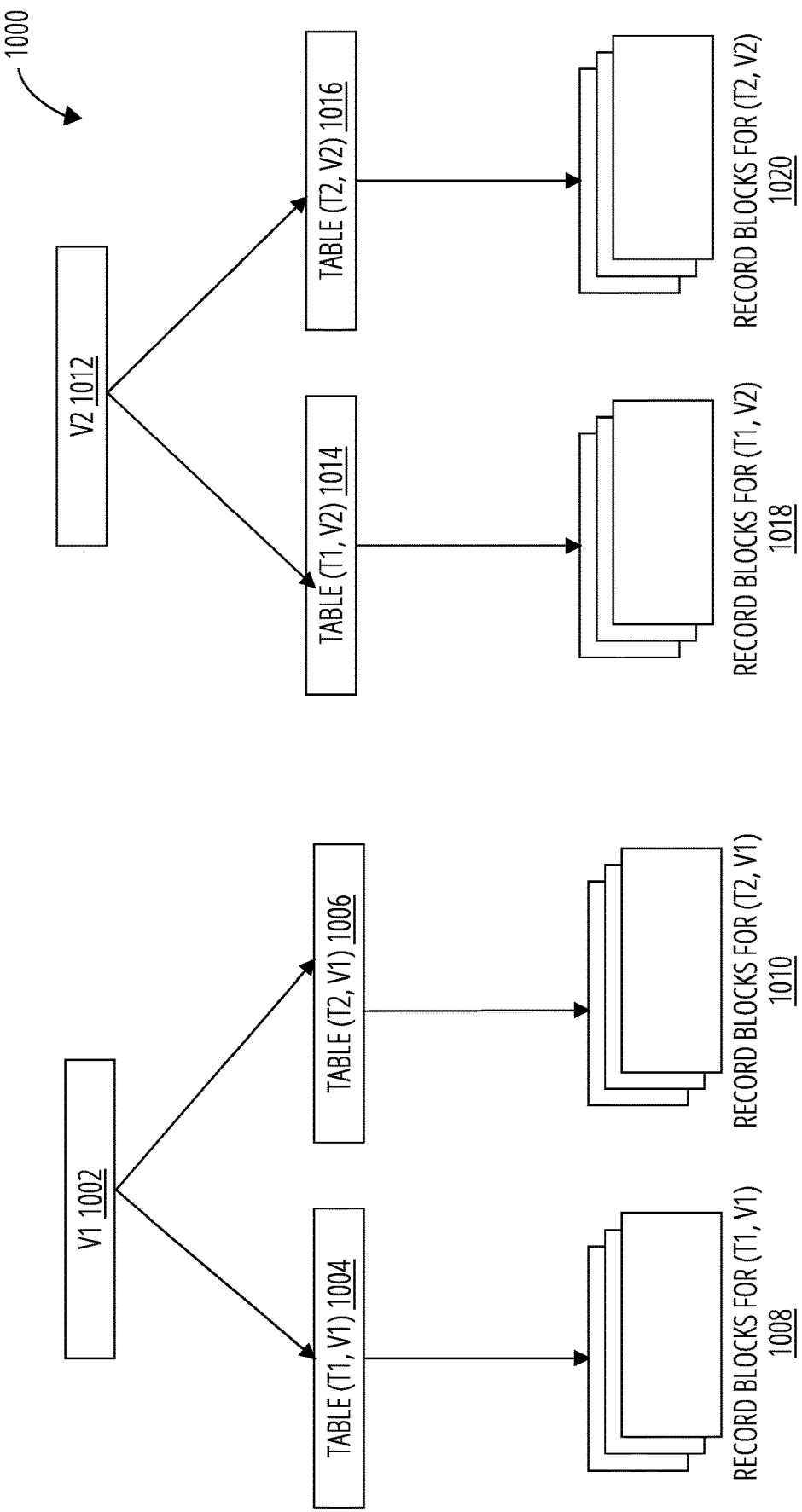
FIG. 10 illustrates a versioned record block entity relationship in accordance with one embodiment.

FIG. 10 illustrates versioned record block entity relationships 1000 in accordance with one embodiment.

From a database-wide perspective, each version of the database is associated with a set of record blocks for each table. For example, in FIG. 10, there are two tables (T1, T2) and two versions (V1 1002 and V2 1012). There are two versions of Table T1, denoted Table (T1, V1) 1004 and Table (T1, V2) 1014. There are two versions of Table T2, denoted Table (T2, V1) 1006 and Table (T2, V2) 1016. There is a set of record blocks for (T1, V1) 1008 and a set of record blocks for (T2, V1) 1010. Similarly, there is a set of record blocks for (T1, V2) 1018 and a set of record blocks for (T2, V2) 1020.

Figure 11:
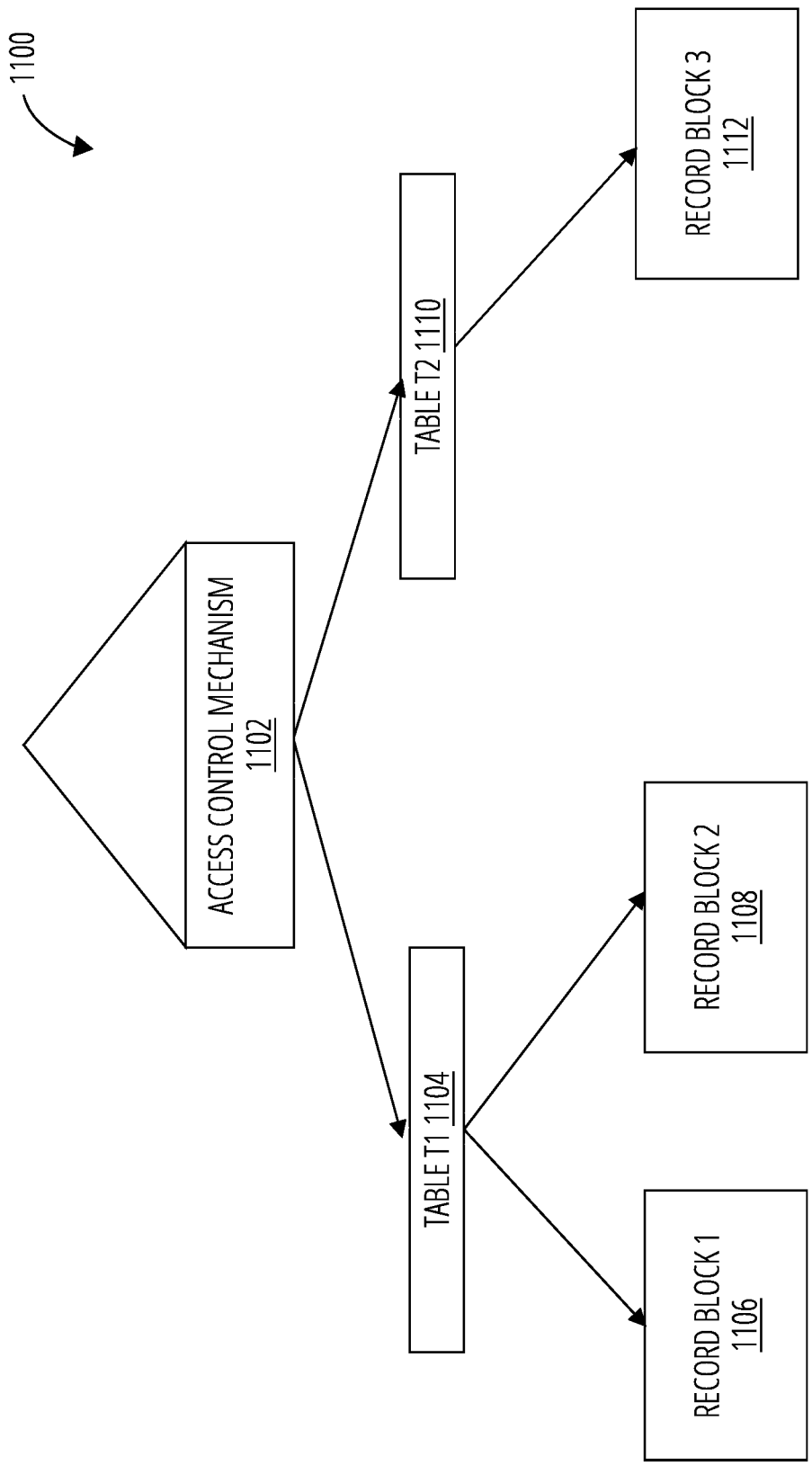
FIG. 11 illustrates an in-memory representation of an unversioned record block index in accordance with one embodiment.

FIG. 11 illustrates an in-memory representation of an unversioned record block index 1100 in accordance with one embodiment.

A Record Block Index is an in-memory representation of the relationships between versions, tables, records, and record blocks (as described in FIG. 10), which enables identification of record blocks that contain the data for a given table and version.

As shown in FIG. 11, an unversioned database has an unversioned record block index 1100, which holds information for exactly one version of the database. The record block index has an access control mechanism 1102, which enables update of its contents.

Figure 12:
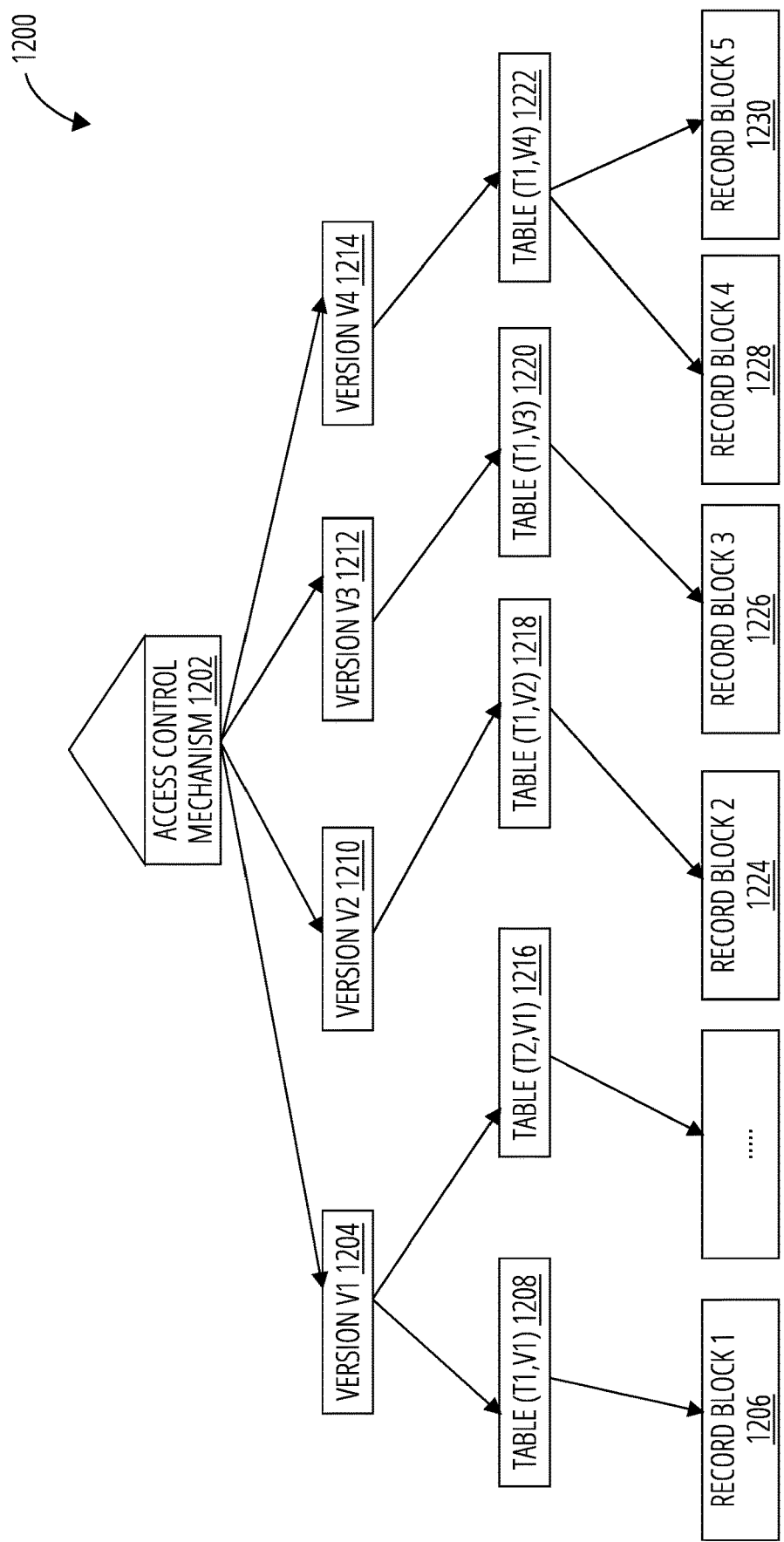
FIG. 12 illustrates an in-memory representation of a versioned record block index in accordance with one embodiment.

FIG. 12 illustrates an in-memory representation of a versioned record block index 1200 in accordance with one embodiment.

A versioned database has a versioned record block index 1200, as shown, for example, in FIG. 12. It holds information for multiple versions of the database.

The record block index has an access control mechanism 1202 which enables for an atomic update of its contents. It can be implemented by any of known techniques in the art, including: a b+ tree locking technique; or any of the exclusive lock mechanisms identified in the process overview 1300 below.

Figure 13:
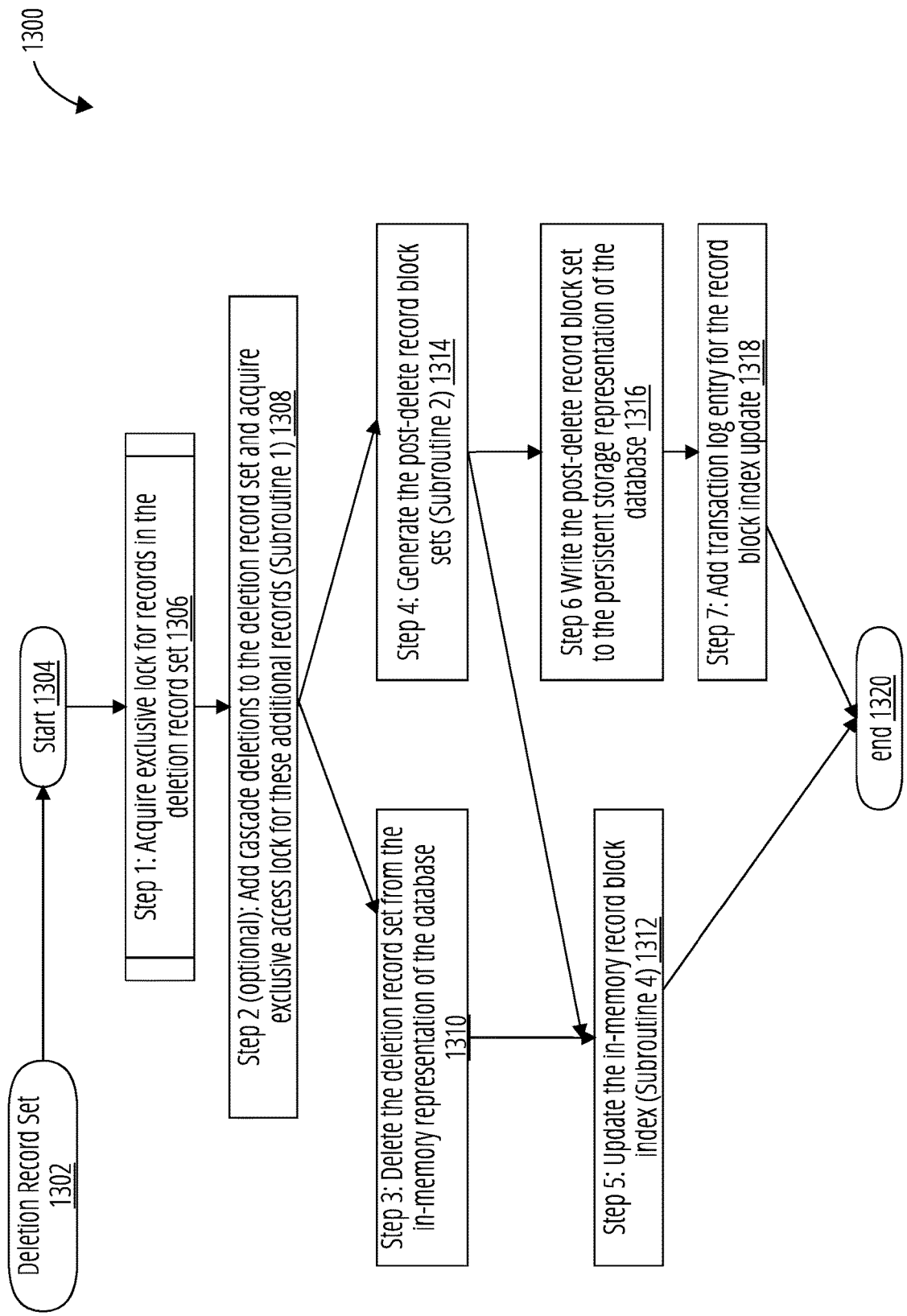
FIG. 13 illustrates a process overview in accordance with one embodiment.

FIG. 13 illustrates a process overview 1300 in accordance with one embodiment.

The input to this process is a deletion record set 1302, which is a set of records to be deleted, identified by the tables and ids of the records. It can be input by a database user. The deletion set can be a list of records per table.

These records may be identified by querying the database for records that match certain conditions. In another method, a database user can execute an internal database procedure to identify records that match certain conditions.

In the process overview 1300, at step 1: acquire an exclusive lock for the records in the deletion record set. There are known implementations in the art of exclusive locks, including, for example:
(1) Mutual exclusion lock that is acquired by all readers and writers;
(2) Readers-writer lock, where the exclusive lock is the writer lock;
(3) Acquire and release may be no-ops if exclusive access to the records to be deleted is already known when the bulk deletion process is being run. For example, the database administrator can terminate all clients except the client that is running the bulk deletion process; and
(4) Other types of database access locks can be used to implement exclusive access.

The exclusive lock's granularity may be: database-wide, table-wide, per-group of records, or per-record.

Step 2, as shown in FIG. 13, is optional. To maintain referential integrity of the database, it may be desirable to additionally delete records that reference records in the deletion record set. This feature is known as cascade deletion, and is further described in Subroutine 1 (see FIG. 14) which describes how to compute the records that should be cascade deleted, and add them to the deletion record set.

Step 3 and Step 4 can be executed in parallel.

At Step 3, delete the deletion record set from the in-memory representation of the database.

At Step 4, for each (table, version), define the term "per-(table, version) pre-delete record block set" to mean the set of record blocks that contain the data for that (table, version) at the point in time before the bulk-delete process begins. These are identified by the record block index. Step 4 processes the pre-delete record block sets using Subroutine 2 (which is described in FIG. 15). The outputs of Subroutine 2 are the per-(table, version) post-delete record block sets.

Figure 18:
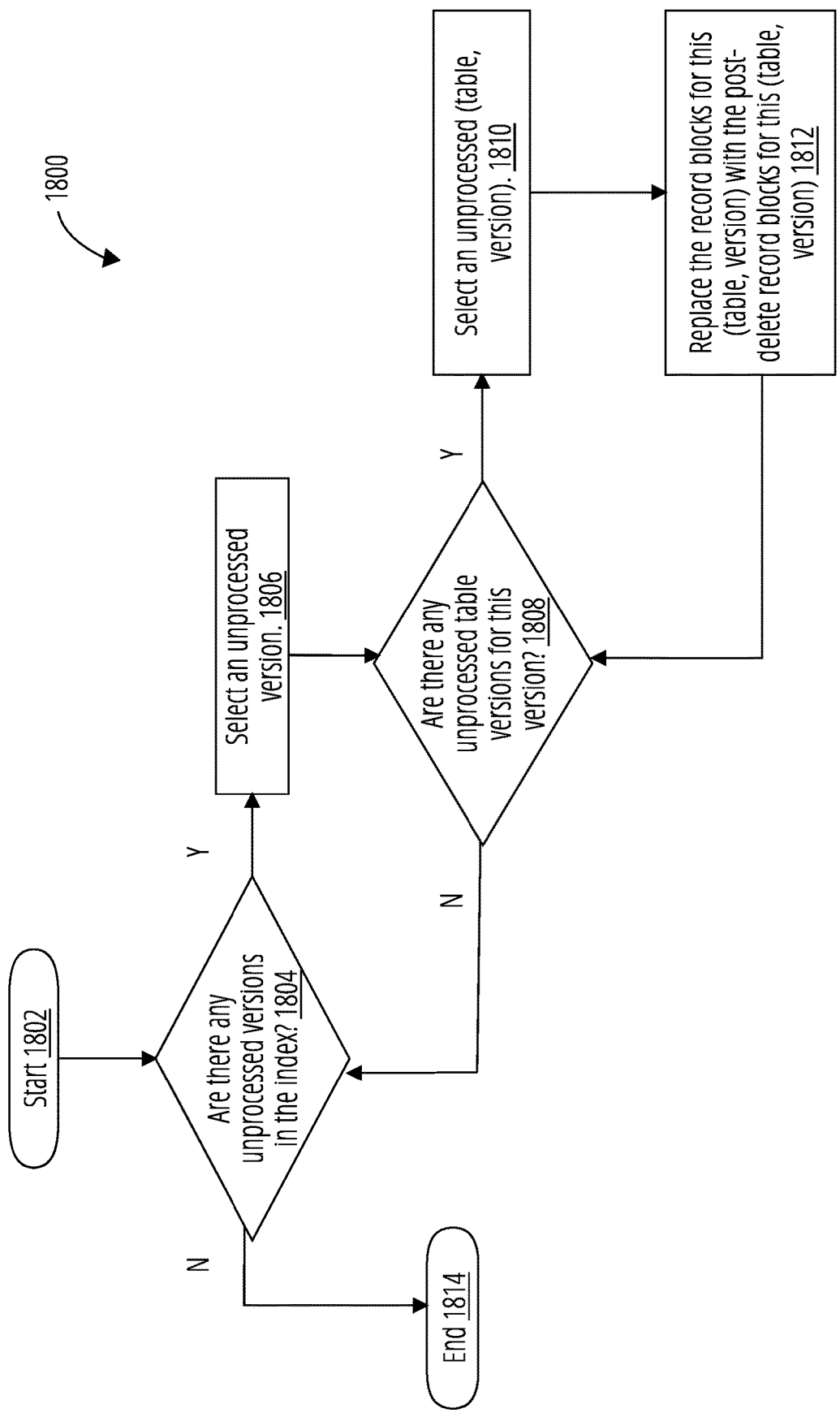
FIG. 18 illustrates a fourth subroutine in accordance with one embodiment.

Step 5 is executed after completion of Steps 3 and 4. Step 5 replaces the pre-delete record block set for each (table, version) with the corresponding post-delete record block set in the record block index. This is described further in Subroutine 4 (FIG. 18).

At Step 6, write the new post-delete record blocks to the persistent storage. The post-delete record block sets may contain both pre-existing and new record blocks. Some record blocks from the pre-delete sets don't require modification, so they can be transferred to the post-delete record block sets. Since these record blocks already reside in the persistent storage representation, they do not need to be rewritten. New record blocks are generated by Subroutine 2, as described in FIG. 15.

At Step 7, transaction log the record block index update. This appends an entry to the transaction log that describes the record blocks to be removed and added to the record block index. See Example 1d) below for an example.

Step 5 can be executed in parallel with Steps 6 and 7. The process ends when all steps have been completed.

Subroutine 1

Figure 14:
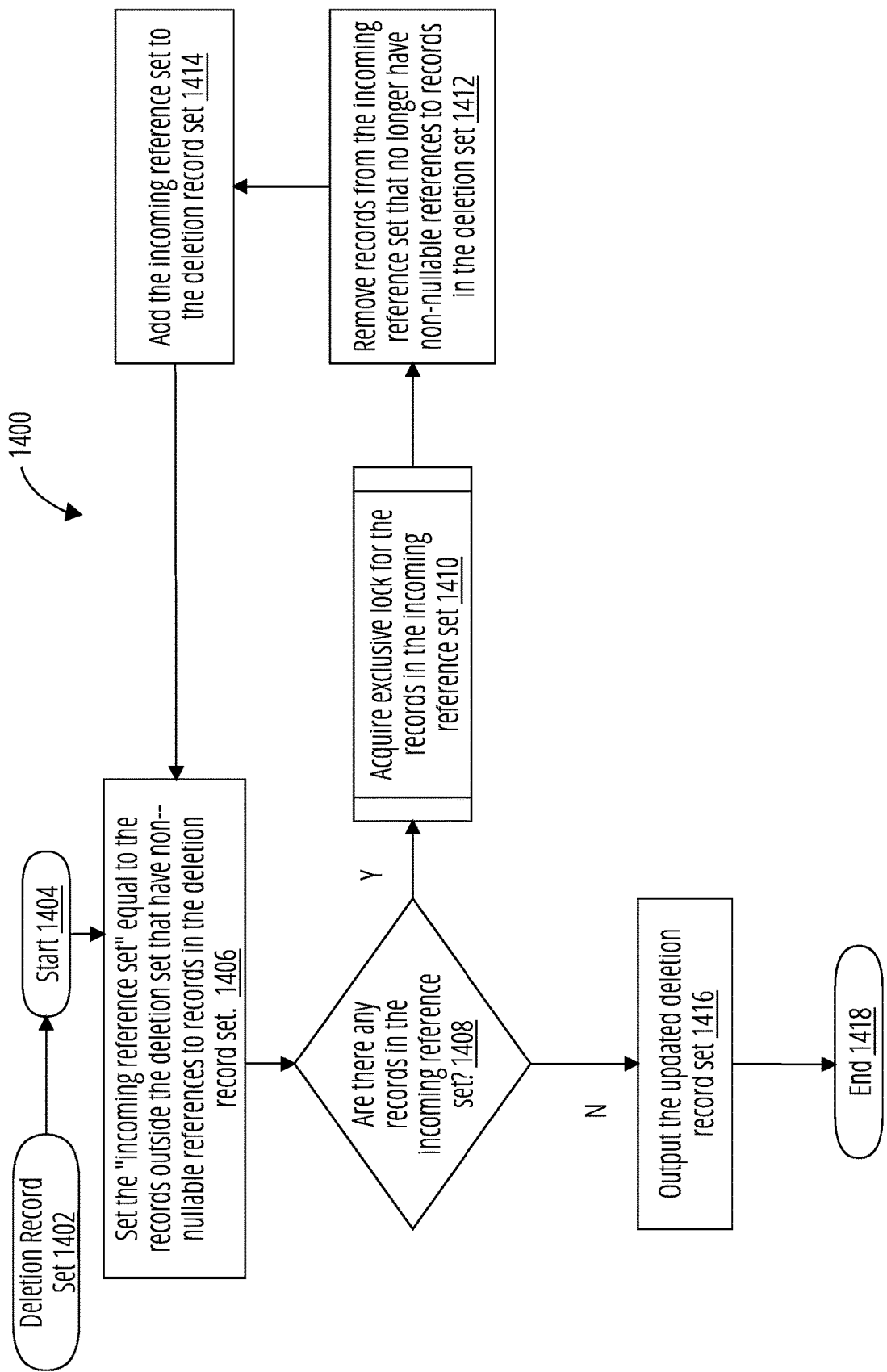
FIG. 14 illustrates a first subroutine in accordance with one embodiment.

FIG. 14 illustrates Subroutine 1 1400 in accordance with one embodiment. In summary, Subroutine 1 adds cascade deletions to the deletion record set, and acquires exclusive access lock for the additional records.

After receiving a deletion record set (step 1402), at block 1406, Subroutine 1 1400 sets the "incoming reference set" equal to the records outside the deletion set that have non-nullable references to records in the deletion record set.

If there are no records in the incoming reference set ('no' at decision block 1408), then the updated deletion record set is output (block 1416), and the subroutine ends at 1418.

If, on the other hand, there are records in the incoming reference set ('yes' at decision block 1408), then an exclusive lock for the records in the incoming reference set is acquired (1410). Subsequently, records from the incoming reference set that no longer have non-nullable references to records in the deletion set, are removed from the incoming reference set (block 1412). At block 1414, add the incoming reference set to the deletion record set. The process then returns to block 1406, and resumes.

Subroutine 2

Figure 15:
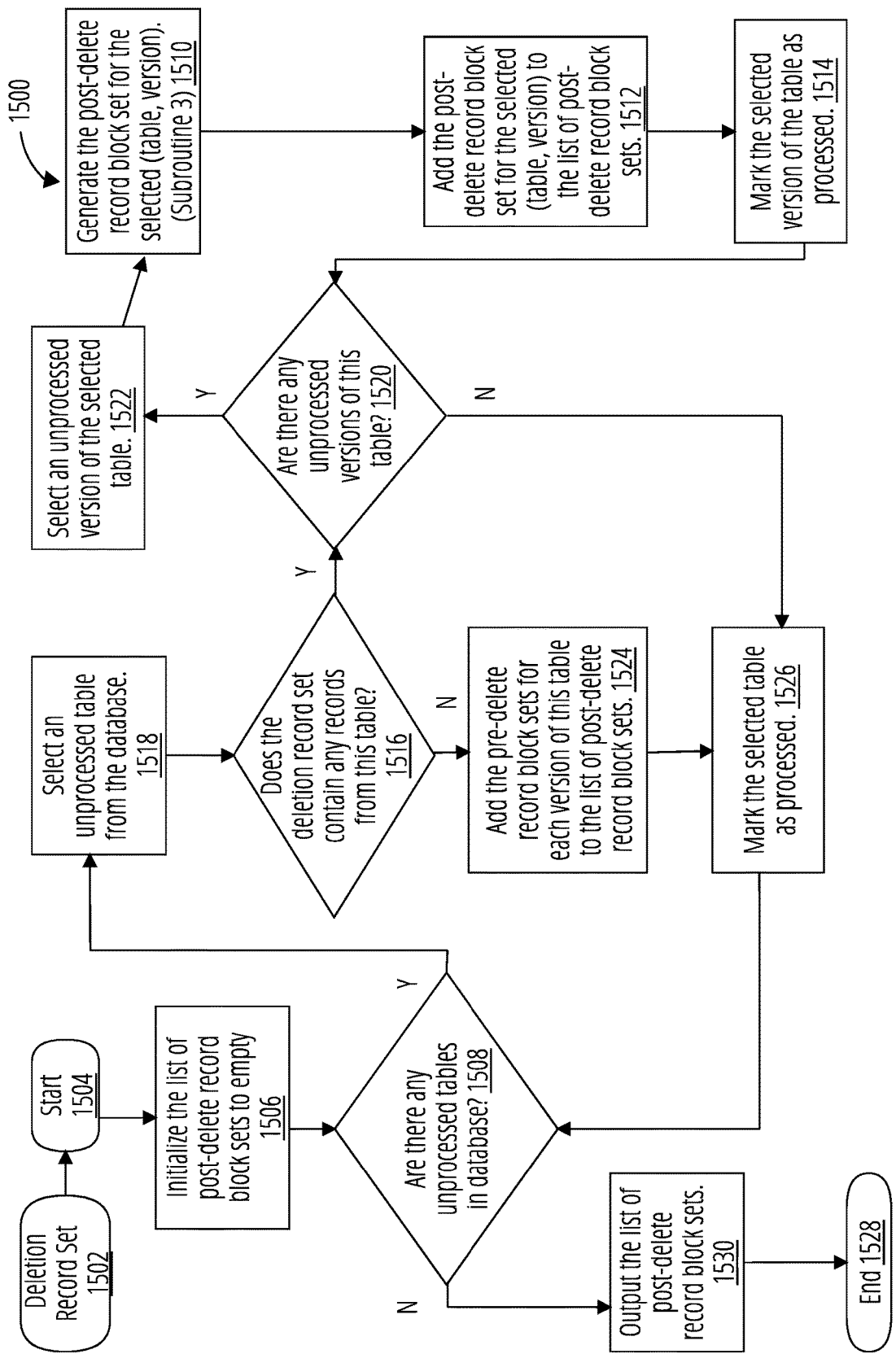
FIG. 15 illustrates a second subroutine in accordance with one embodiment.

FIG. 15 illustrates Subroutine 2 1500 in accordance with one embodiment. Subroutine 2 generates the post-delete record block sets.

In summary, Subroutine 2 transforms the pre-delete record block sets by dropping out the records specified by the input deletion record set. The transformed record blocks are the post-delete record block sets. Subroutine 2 iterates Subroutine 3 (at block 1510) for each table and table version in the database. The iteration order is not significant.

After receiving a deletion record set (step 1502), at block 1506, Subroutine 2 1500 initializes the list of post-delete record block sets to empty.

If there are no unprocessed tables in the database ('no' at decision block 1508), then the list of post-delete record block sets is output (block 1530), and the subroutine ends at 1528.

If, on the other hand, there are unprocessed tables in the database ('yes' at decision block 1508), then an unprocessed table is selected at block 1518. This is followed by decision block 1516, at which point the deletion record set is checked to see if it contains any records from this table.

If the deletion record set does not contain any records from this table ('no' at decision block 1516), then the pre-delete record block sets for each version of this table is added to the list of post-delete record block sets (block 1524). The selected table is then marked as processed (block 1526), and the subroutine returns to decision block 1508.

If the deletion record set does contain any records from this table ('yes' at decision block 1516), then decision block 1520 is encountered, to see if there are any unprocessed versions of this table. If there are no unprocessed versions of this table ('no' at decision block 1520), then the subroutine returns to block 1526 to mark the selected table as processed.

If there are unprocessed versions of this table ('yes' at decision block 1520), then an unprocessed version of the selected table is selected (block 1522). This is followed by using Subroutine 3 to generate the post-delete record block set for the selected (table, version) at block 1510. Subroutine 3 is further described in FIG. 16 and FIG. 17.

Subsequently, the post-delete record block set for the selected (table, version) is added to the list of post-delete record block sets at block 1512. The selected version of the table is marked as processed (block 1514), and decision block 1520 is once again processed.

Subroutine 3

As described in FIG. 15, Subroutine 2 iterates Subroutine 3 for each table and table version in the database. The iteration order is not significant.

In summary, Subroutine 3 generates the post-delete record block set for a specific (table, version). Other record block transformations can be combined with Subroutine 3, but they are not necessary for the bulk deletion process work. Two implementations of Subroutine 3 are provided to illustrate this.

Subroutine 3, Implementation 1

Figure 16:
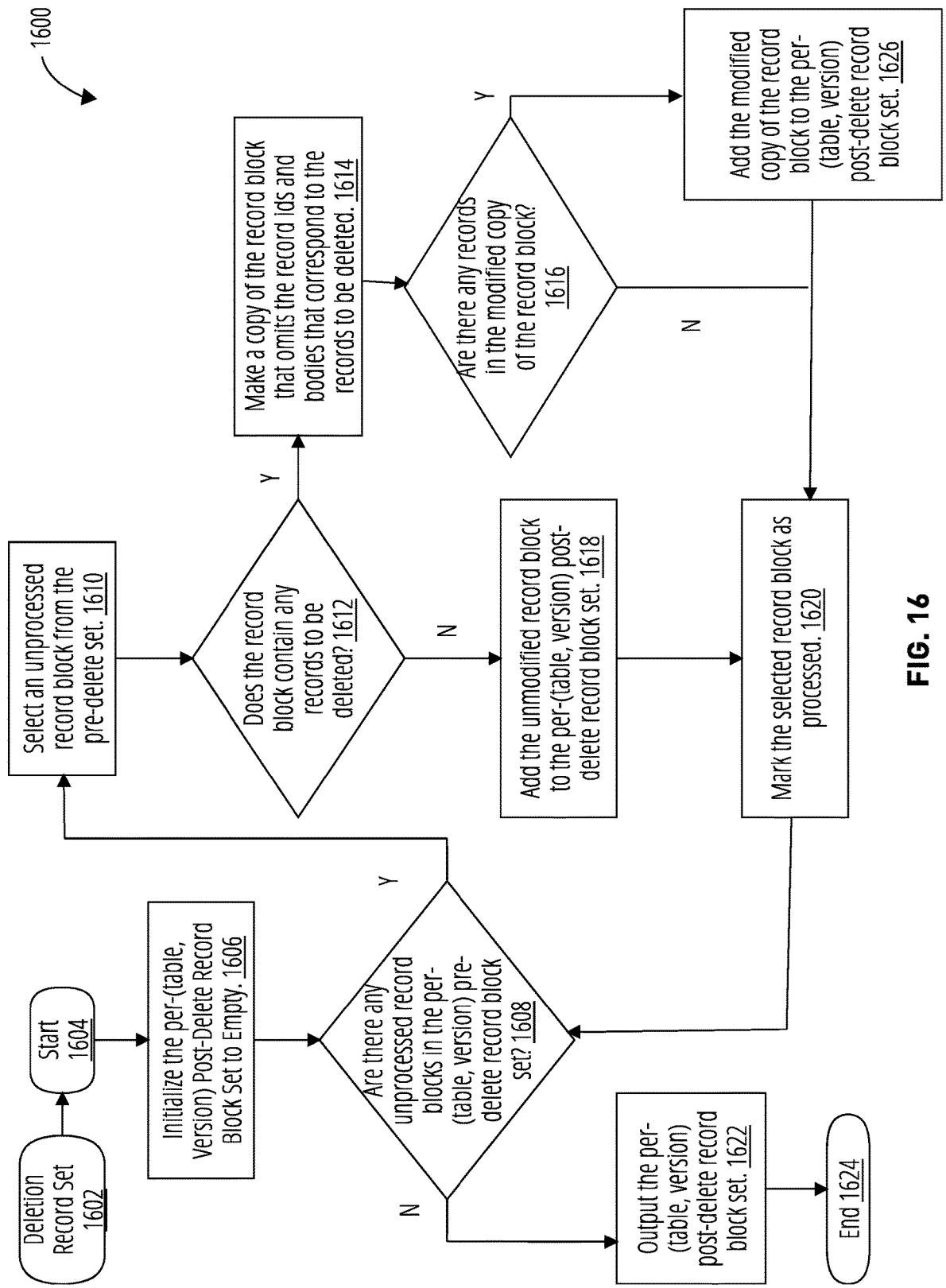
FIG. 16 illustrates a first implementation of a third subroutine in accordance with one embodiment.

FIG. 16 illustrates a first implementation of Subroutine 3 1600 in accordance with one embodiment. In FIG. 16, Subroutine 3 generates the post-delete record block set for the selected (table, version).

After receiving a deletion record set (step 1602), at block 1606, Subroutine 3 1600 initializes the per-(table, version) post-delete record block set to empty.

If there are no unprocessed record blocks in the per-(table, version) pre-delete record block set ('no' at decision block 1608), then the per-(table, version) post-delete record block set is output (block 1622), and the subroutine ends at 1624.

If, on the other hand, there are unprocessed record blocks in the per-(table, version) pre-delete record block set ('yes' at decision block 1608), then an unprocessed record block from the pre-delete set is selected at 1610. This is followed by decision block 1612, at which point the record block is checked to see if it contains any records to be deleted.

If the record block does not contain any records to be deleted ('no' at decision block 1612), then the unmodified record block is added to the per-(table, version) post-delete record block set (block 1618). The selected record block is then marked as processed (block 1620), and the subroutine returns to decision block 1608.

If the record block does contain records to be deleted ('yes' at decision block 1612), then the subroutine makes a copy of the record block that omits the record ids and bodies that correspond to the records to be deleted (block 1614). This is followed by decision block 1616, at which point there is a check on whether there are any records in the modified copy of the record block.

If there are no records in the modified copy of the record block ('no' at decision block 1616), then the selected record block is marked as processed (block 1620), and the subroutine returns to decision block 1608.

If there are records in the modified copy of the record block ('yes' at decision block 1616), then the modified copy of the record block is added to the per-(table, version) post-delete record block set (block 1626). The selected record block is then marked as processed (block 1620), and the subroutine returns to decision block 1608.

Subroutine 3, Implementation 2

Figure 17:
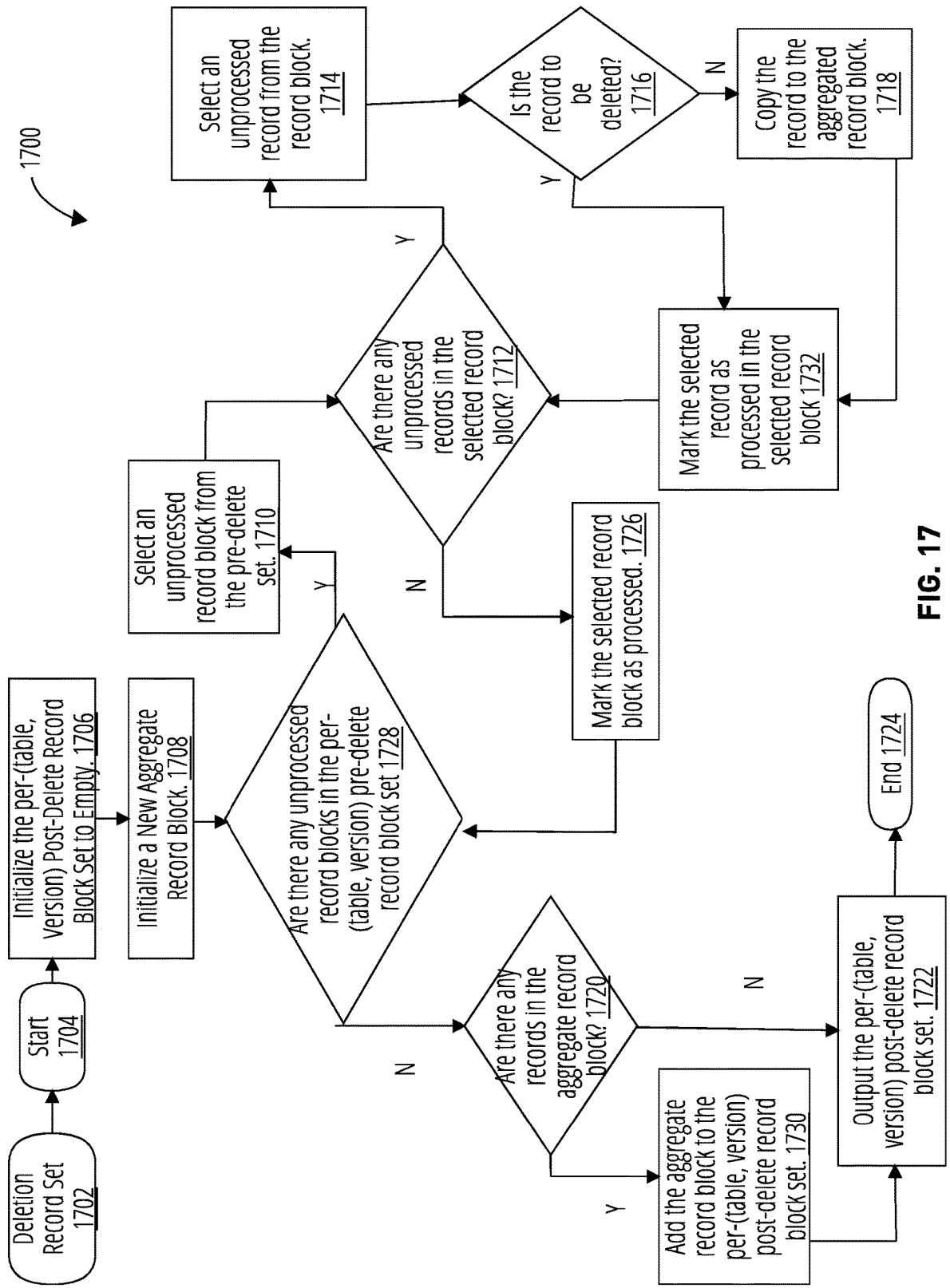
FIG. 17 illustrates a second implementation of a third subroutine in accordance with one embodiment.

FIG. 17 illustrates a second implementation of Subroutine 3 1700 in accordance with one embodiment. In FIG. 17, Subroutine 3 generates the post-delete record block set for the selected (table, version).

After receiving a deletion record set (at 1702), at block 1706, Subroutine 3 1700 initializes the per-(table, version) post-delete record block set to empty. It then initializes a new aggregate record block at 1708.

If there are no unprocessed record blocks in the per-(table, version) pre-delete record block set ('no' at decision block 1728), then there is a check to see if there are any records in the aggregate record block at decision block 1720. If there are records in the aggregate record block ('yes' at decision block 1720), then the aggregate record block is added to the per-(table, version) post-delete record block set (at 1730), followed by output of the per-(table, version) post-delete record block set (at 1722), after which the subroutine ends at 1724. If there are no records in the aggregate record block ('no' at decision block 1720), then there is output of the per-(table, version) post-delete record block set (at 1722), after which the subroutine ends at 1724.

If there are unprocessed record blocks in the per-(table, version) pre-delete record block set ('yes' at decision block 1728), then an unprocessed record block from the pre-delete set is selected at 1710. This is followed by decision block 1712, at which point there is a check to see if there are any unprocessed records in the selected record block. If there are no unprocessed records in the selected record block ('no' at decision block 1712), then the selected record block is marked as processed (at 1726), and the subroutine returns to decision block 1728.

If, on the other hand, there are unprocessed records in the selected record block ('yes' at decision block 1712), then an unprocessed record is selected from the record block (at 1714). If the record is to be deleted ('yes' at decision block 1716), then the selected record is marked as processed (at 1732), and the subroutine returns to decision block 1712. If the record is not to be deleted ('no' at decision block 1716), then the record is copied to the aggregated record block (at 1718), followed by marking the selected record as processed (at 1732), and the subroutine returns to decision block 1712.

Subroutine 4

FIG. 18 illustrates Subroutine 4 1800 in accordance with one embodiment. In FIG. 18, Subroutine 4 updates the record block index.

In summary, Subroutine 4 iterates each (table, version) in the record block index, and replaces the record block set for each (table, version) with the per-(table, version) post-delete record block set. The (table, version) iteration order is not significant. The record block index's access control mechanism is used to ensure that other users always observe a consistent view of the record block index.

According to FIG. 18, if there are no unprocessed versions in the index ('no' at decision block 1804), then the subroutine ends at 1814.

On the other hand, if there are unprocessed versions in the index ('yes' at decision block 1804), then an unprocessed version is selected at 1806. If there are any unprocessed table versions for this version ('yes' at decision block 1808), then an unprocessed (table, version) is selected at 1810, followed by replacement of the record blocks for this (table, version) with the post-delete record blocks for this (table, version) at 1812, after which the subroutine returns to decision block 1808. However, if there are no unprocessed table versions for this version ('no' at decision block 1808), then the subroutine returns to decision block 1804.

Example 1

Figure 19:
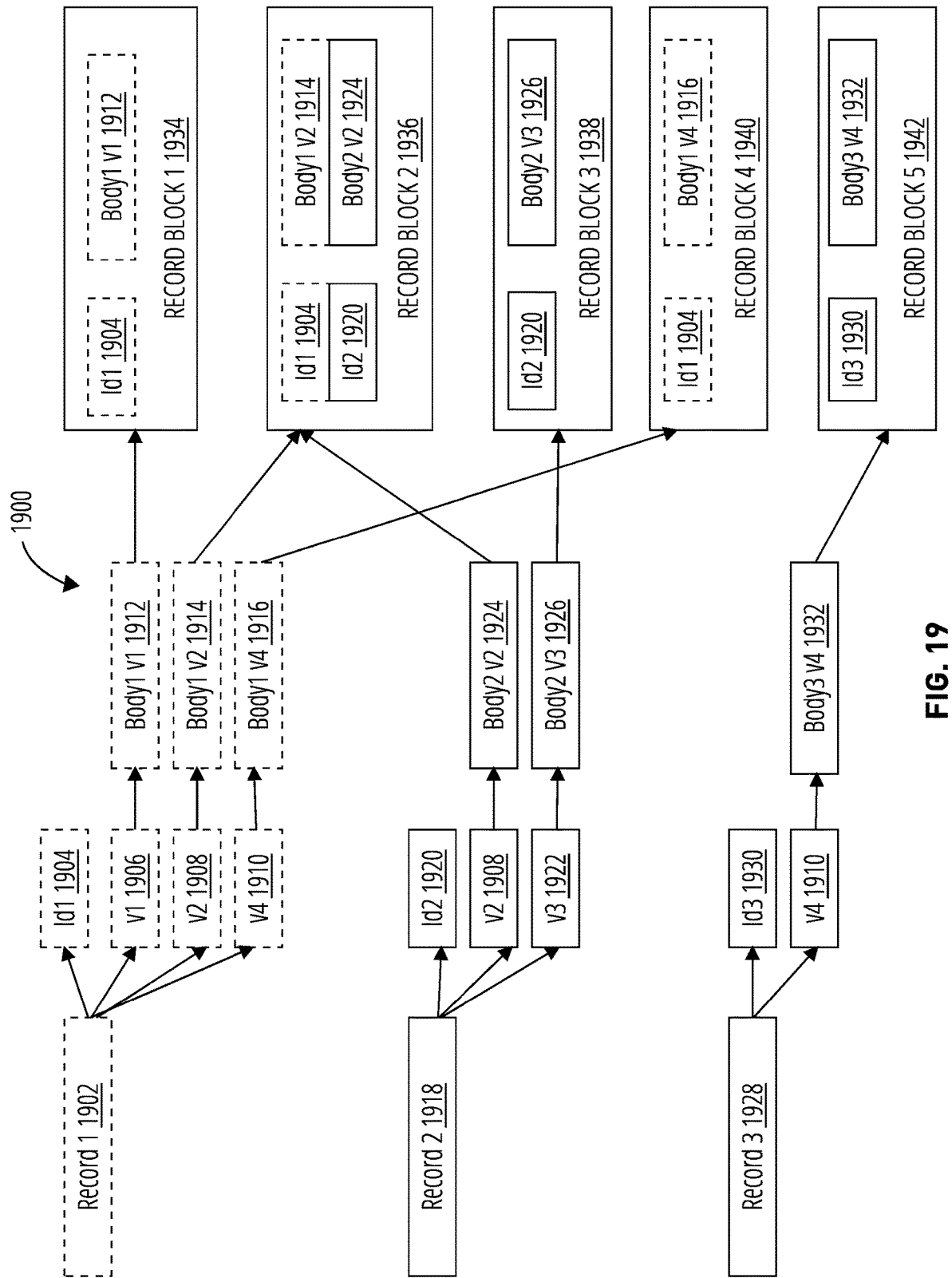
FIG. 19 illustrates a first aspect of an example in accordance with one embodiment.
Figure 20:
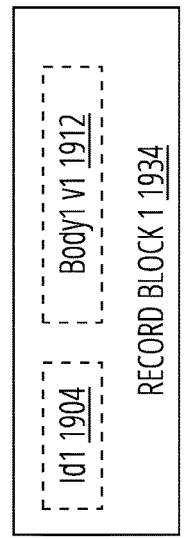
FIG. 20 illustrates a second aspect of the example shown in FIG. 19.
Figure 20:
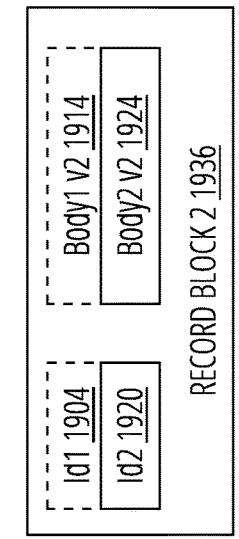
Figure 20:
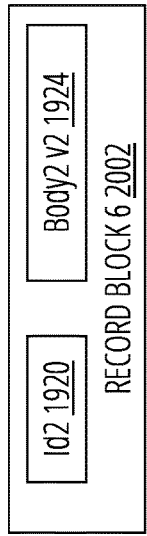
Figure 20:
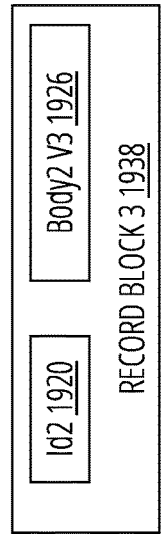
Figure 20:
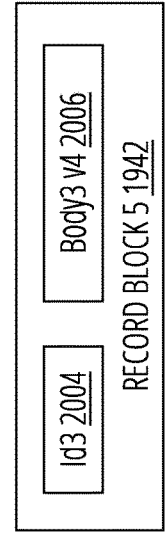
Figure 21:
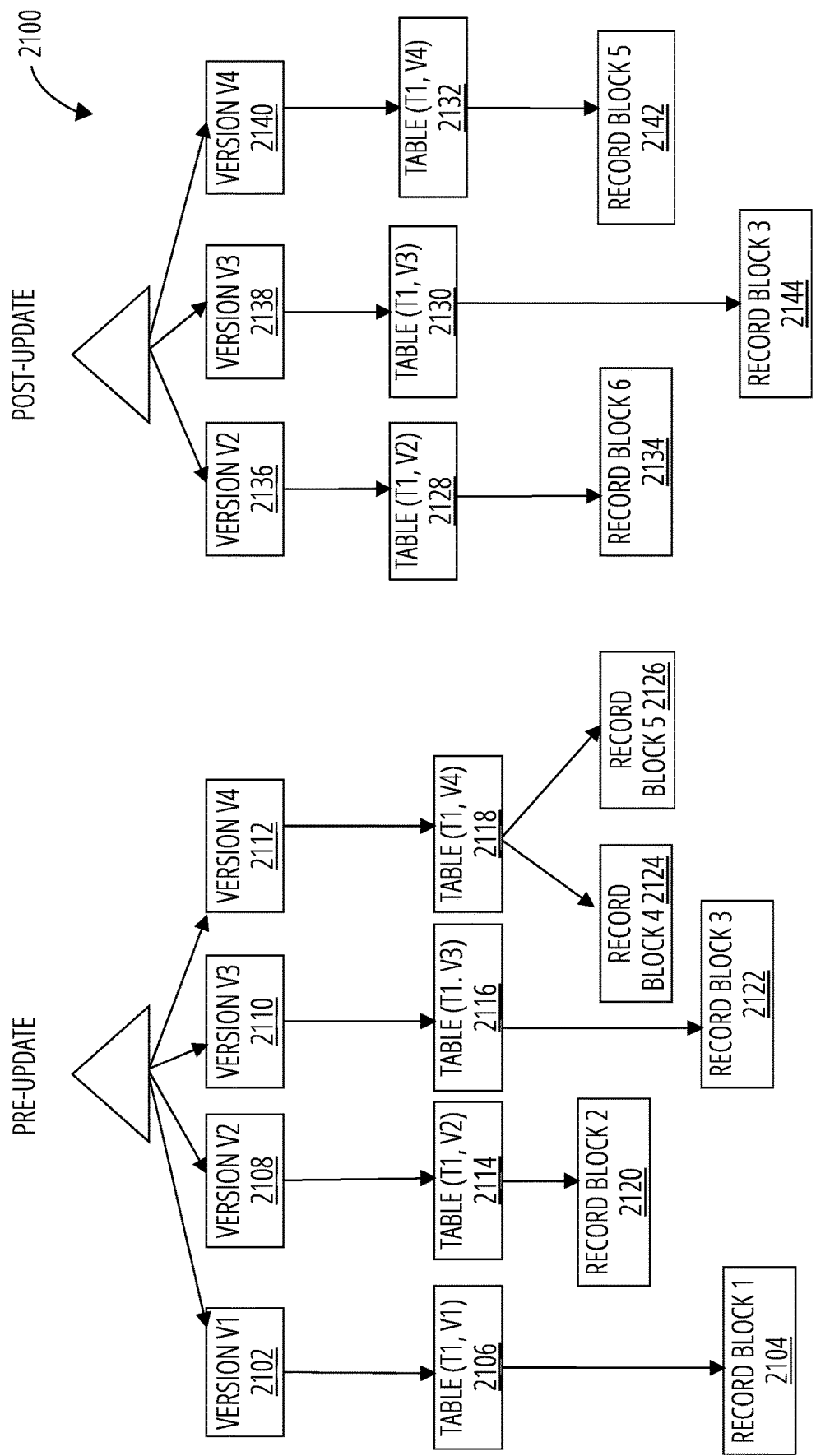
FIG. 21 illustrates a third aspect of the example shown in FIG. 19.

In Example 1, Record1 is deleted from Table T1. This is illustrated in FIG. 19-FIG. 21, as follows:

FIG. 19 (Example 1A) illustrates the entities associated with Record1 that need to be deleted;

FIG. 20 (Example 1B) illustrates the pre- and post-delete record block sets; and FIG. 21 (Example 1C) illustrates the pre- and post-update record block index.

Example 1A

FIG. 19 illustrates Example 1A 1900 in accordance with one embodiment. In particular, FIG. 19 (Example 1A) illustrates the entities associated with Record1 that need to be deleted—as shown in the dashed boxes.

Record 1 1902 has associated with it: Id1 1904, v1 1906, v2 1908 and v4 1910; while v1 1906 is associated with Body1 v1 1912, v2 1908 is associated with Body1 v2 1914, and v4 1910 is associated with Body1 v4 1916. As such, Id1 1904 and Body1 v1 1912, in Record Block 1 1934, need to be deleted; Id1 1904 and Body1 v2 1914, in Record Block 2 1936, need to be deleted; and Id1 1904 and Body1 v4 1916, in Body2 V3 1926, need to be deleted.

Note that Record 2 1918 and Record 3 1928 are not to be deleted.

Record 2 1918 has associated with it: Id2 1920, v2 1908 and v3 1922, while v2 1908 is associated with Body2 v2 1924 and v3 1922 is associated with Body2 V3 1926. Record Block 2 1936 includes Id2 1920 and its associated Body2 v2 1924, while Body2 V3 1926 includes Id2 1920 and Body2 V3 1926.

Record 3 1928 has associated with it: Id3 1930 and v4 1910, while v4 1910 is associated with Body3 v4 1932. Record Block 5 1942 includes Id3 1930 and its associated Body3 v4 1932.

Example 1B

FIG. 20 illustrates Example 1B 2000. In particular, FIG. 20 (Example 1B) illustrates deletion of Record1: deleted Record Blocks via Subroutine 4 (see FIG. 18 for Subroutine 4).

On the left of FIG. 20, are the pre-delete record blocks, which are the record blocks shown in FIG. 19 (i.e. Record Block 1 1934, 1936, Body2 V3 1926, Body2 V3 1926, and Record Block 5 1942). The entities to be deleted are outlined in dashed boxes: Id1 1904 with its associated Body1 v1 1912; Id1 1904 with its associated Body1 v2 1914; and Id1 1904 with its associated Body1 v4 1916.

On the right of FIG. 20, are the post-delete record blocks: Record Block 6 2002, Body2 V3 1926, and Record Block 5 1942. Note that Record Block 1 1934 and Body2 V3 1926 have been deleted entirely, since each contains only an Id and associated Body that is to be deleted: Record Block 1 1934 with Id1 1904 and associated Body1 v1 1912; and Body2 V3 1926 with Id1 1904 and associated Body1 v4 1916. Record Block 6 2002 is a modification of Record Block 2 1936, after the deletion of Id1 1904 and associated Body1 v2 1914. Body2 V3 1926 and Record Block 5 1942 remain unchanged as neither record block contains an entity to be deleted.

Example 1C

FIG. 21 illustrates Example 1C 2100. In particular, FIG. 21 (Example 1C) illustrates an update of the Record Block Index by Subroutine 4 (FIG. 18).

On the left of FIG. 21, is the pre-updated Record Block index, while on the left is the post-update Record Block index.

Example 1D

An example transaction log entry for Example 1C shown in FIG. 21 is:
Delete record block 1 2104 from Table (T1, V1) 2106
Delete record block 2 2120 from Table (T1, V2) 2114
Delete record block 4 2124 from Table (T1, V4) 2118
Add record block 6 2134 to Table (T1, V2) 2128

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for bulk data deletion from a database, the method comprising:
   receiving, by a processor, a deletion record set for the bulk data deletion identified by executing an internal database procedure or querying an in-memory representation of the database for records that match certain conditions, wherein the bulk data deletion is performed without taking the database offline;
   acquiring, by the processor, an exclusive lock for one or more records in the deletion record set;
   deleting, by the processor, the deletion record set from the in-memory representation of the database and, to maintain referential integrity of the database, additionally deleting records that reference records in the deletion record set;
   generating, by the processor, one or more post-delete record block sets, wherein the one or more post delete record blocks are different from the deletion record set;
   updating, by the processor, an in-memory record block index, wherein the record block index has an access control mechanism which enables an atomic update of its contents;
   writing, by the processor, the one or more post-delete record block sets to a persistent storage representation of the database;
   adding, by the processor, a transaction log entry for the updated record block index update, wherein the each transaction log entry describes an ACID (atomic, consistent, isolated and durable) update to the database;
   replacing, by the processor, the record block for an unprocessed table associated with an unprocessed version with the post-delete record blocks for a selected table and a selected version; and
   executing, by the processor, the deleting of the deletion record set from the in-memory representation of the database, and the generating of the one or more post-delete record block sets, in parallel.

2. The computer-implemented method of claim 1, wherein:
   updating, by the processor, the in-memory record block index, is performed in parallel with:
   writing, by the processor, the one or more post-delete record block sets to the persistent storage representation of the database; and
   adding, by the processor, the transaction log entry for the updated record block index update.

3. The computer-implemented method of claim 1, wherein generating the one or more post-delete record block sets comprises:
   initializing, by the processor, a list of post-delete record block sets to empty;
   selecting, by the processor, an unprocessed table from the database;
   selecting, by the processor, an unprocessed version from the selected table;
   generating, by the processor, a post-delete record block set for the selected table and the selected version; and
   adding, by the processor, the post-delete record block set for the selected table, and selected version to the list of post-delete record block sets.

4. The computer-implemented method of claim 3, wherein generating the post-delete record block set for the selected table and the selected version comprises:
   initializing, by the processor, a per-(table, version) post-delete record block set to empty;
   selecting, by the processor, an unprocessed record block from a pre-delete set, the unprocessed record block containing a record to be deleted;
   producing, by the processor, a modified copy of the record block that omits both a record id and a record body that corresponds to the record to be deleted; and
   adding, by the processor, the modified copy to the per (table, version) post-delete record block set.

5. The computer-implemented method of claim 1, wherein updating the in-memory record block index comprises:
   selecting, by the processor, an unprocessed version;
   selecting, by the processor, an unprocessed table associated with the unprocessed version;

replacing, by the processor, the record block for the selected table and the selected version with the post-delete record blocks for the selected table and the selected version.

6. A system comprising:
a processor; and
a memory storing instructions that, when executed by the processor, configure the system to:
receive, by the processor, a deletion record set for bulk data deletion identified by executing an internal database procedure or querying an in-memory representation of the database for records that match certain conditions, wherein the bulk data deletion is performed without taking the database offline;
acquire, by the processor, an exclusive lock for one or more records in the deletion record set;
delete, by the processor, the deletion record set from the in-memory representation of a database and, to maintain referential integrity of the database, additionally delete records that reference records in the deletion record set;
generate, by the processor, one or more post-delete record block sets, wherein the one or more post delete record blocks are different from the deletion record set;
update, by the processor, an in-memory record block index, wherein the record block index has an access control mechanism which enables an atomic update of its contents;
write, by the processor, the one or more post-delete record block sets to a persistent storage representation of the database; and
add, by the processor, a transaction log entry for the updated record block index update, wherein the each transaction log entry describes an ACID (atomic, consistent, isolated and durable) update to the database;
replace, by the processor, the record block for an unprocessed table associated with an unprocessed version with the post-delete record blocks for a selected table and a selected version; and
execute, by the processor, the deletion of the deletion record set from the in-memory representation of the database, and the generation of the one or more post-delete record block sets, in parallel.

7. The system of claim 6, wherein the memory storing instructions that, when executed by the processor, further configure the system to:
execute, by the processor, updating the in-memory record block index, in parallel with:
writing the one or more post-delete record block sets to the persistent storage representation of the database; and
adding the transaction log entry for the updated record block index update.

8. The system of claim 6, wherein when generating the one or more post-delete record block sets, the memory storing instructions that, when executed by the processor, further configure the system to:
initialize, by the processor, a list of post-delete record block sets to empty;
select, by the processor, an unprocessed table from the database;
select, by the processor, an unprocessed version from the selected table;
generate, by the processor, a post-delete record block set for the selected table and the selected version; and
add, by the processor, the post-delete record block set for the selected table, and selected version to the list of post-delete record block sets.

9. The system of claim 8, wherein when generating the post-delete record block set for the selected table and the selected version, the memory storing instructions that, when executed by the processor, further configure the system to:
initialize, by the processor, a per-(table, version) post-delete record block set to empty;
select, by the processor, an unprocessed record block from a pre-delete set, the unprocessed record block containing a record to be deleted;
produce, by the processor, a modified copy of the record block that omits both a record id and a record body that corresponds to the record to be deleted; and
add, by the processor, the modified copy to the per (table, version) post-delete record block set.

10. The system of claim 6, wherein when updating the in-memory record block index, the memory storing instructions that, when executed by the processor, further configure the system to:
select, by the processor, an unprocessed version;
select, by the processor, an unprocessed table associated with the unprocessed version;
replace, by the processor, the record block for the selected table and the selected version with the post-delete record blocks for the selected table and the selected version.

11. A non-transitory computer-readable storage medium, the computer-readable storage medium including instructions that when executed by a computer, cause the computer to:
receive, by a processor, a deletion record set for bulk data deletion identified by executing an internal database procedure or querying an in-memory representation of the database for records that match certain conditions, wherein the bulk data deletion is performed without taking the database offline;
acquire, by the processor, an exclusive lock for one or more records in the deletion record set;
delete, by the processor, the deletion record set from the in-memory representation of a database and, to maintain referential integrity of the database, additionally delete records that reference records in the deletion record set;
generate, by the processor, one or more post-delete record block sets, wherein the one or more post delete record blocks are different from the deletion record set;
update, by the processor, an in-memory record block index, wherein the record block index has an access control mechanism which enables an atomic update of its contents;
write, by the processor, the one or more post-delete record block sets to a persistent storage representation of the database; and
add, by the processor, a transaction log entry for the updated record block index update, wherein the transaction log entry describes an ACID (atomic, consistent, isolated and durable) update to the database;
replacing, by the processor, the record block for an unprocessed table associated with an unprocessed version with the post-delete record blocks for a selected table and a selected version; and
execute, by the processor, the deletion of the deletion record set from the in-memory representation of the database, and the generation of the one or more post-delete record block sets, in parallel.

12. The computer-readable storage medium of claim 11, wherein the computer-readable storage medium including instructions that when executed by the computer, further cause the computer to:
- execute, by the processor, updating the in-memory record block index, in parallel with:
- writing the one or more post-delete record block sets to the persistent storage representation of the database; and
- adding the transaction log entry for the updated record block index update.

13. The computer-readable storage medium of claim 11, wherein when generating the one or more post-delete record block sets, the computer-readable storage medium including instructions that when executed by the computer, further cause the computer to:
- initialize, by the processor, a list of post-delete record block sets to empty;
- select, by the processor, an unprocessed table from the database;
- select, by the processor, an unprocessed version from the selected table;
- generate, by the processor, a post-delete record block set for the selected table and the selected version; and
- add, by the processor, the post-delete record block set for the selected table, and selected version to the list of post-delete record block sets.

14. The computer-readable storage medium of claim 13, wherein when generating the post-delete record block set for the selected table and the selected version, the computer-readable storage medium including instructions that when executed by the computer, further cause the computer to:
- initialize, by the processor, a per-(table, version) post-delete record block set to empty;
- select, by the processor, an unprocessed record block from a pre-delete set, the unprocessed record block containing a record to be deleted;
- produce, by the processor, a modified copy of the record block that omits both a record id and a record body that corresponds to the record to be deleted; and
- add, by the processor, the modified copy to the per (table, version) post-delete record block set.

15. The computer-readable storage medium of claim 11, wherein when updating the in-memory record block index, the computer-readable storage medium including instructions that when executed by the computer, further cause the computer to:
- select, by the processor, an unprocessed version;
- select, by the processor, an unprocessed table associated with the unprocessed version;
- replace, by the processor, the record block for the selected table and the selected version with the post-delete record blocks for the selected table and the selected version.

* * * * *